US012535932B2

(12) United States Patent
Nakayama

(10) Patent No.: US 12,535,932 B2
(45) Date of Patent: Jan. 27, 2026

(54) INFORMATION PROCESSING APPARATUS, NON-TRANSITORY COMPUTER READABLE MEDIUM, AND INFORMATION PROCESSING METHOD FOR SELECTION CONTROL ON DISPLAY IN NON-CONTACT MODE

(71) Applicant: FUJIFILM Business Innovation Corp., Tokyo (JP)

(72) Inventor: Shungo Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 622 days.

(21) Appl. No.: 17/858,613

(22) Filed: Jul. 6, 2022

(65) Prior Publication Data
US 2023/0308564 A1 Sep. 28, 2023

(30) Foreign Application Priority Data
Mar. 22, 2022 (JP) .................. 2022-045524

(51) Int. Cl.
G06F 3/0482 (2013.01)
G06F 3/04842 (2022.01)
(Continued)

(52) U.S. Cl.
CPC ........ G06F 3/0482 (2013.01); G06F 3/04842 (2013.01); H04N 1/00326 (2013.01);
(Continued)

(58) Field of Classification Search
CPC ...... G06F 3/0441; G06F 3/0442; G06F 3/046; G06F 3/0482; G06F 3/04842; G06F 3/0485; G06F 3/0487; G06F 3/04883; G06F 3/002; G06F 21/34; G06F 9/451; H04N 1/00514; H04N 1/00326; H04N 1/00395; H04N 1/00413; H04N 1/4426; H04N 1/00411; H04N 1/00416; H04N 1/00419; H04N 1/00421; H04N 1/00424; H04N 1/00427;
(Continued)

(56) References Cited

U.S. PATENT DOCUMENTS 7,840,237 B2 * 11/2010 Panabaker .............. H04W 4/00
345/157
2015/0036185 A1 * 2/2015 Asai ................... H04N 1/00482
358/1.15
(Continued)

FOREIGN PATENT DOCUMENTS

JP 2000-132310 A 5/2000
JP 2018-34319 A 3/2018

OTHER PUBLICATIONS

Oct. 14, 2025 Office Action issued in Japanese Patent Application No. 2022-045524.

*Primary Examiner* — Nicholas Ulrich
(74) *Attorney, Agent, or Firm* — Oliff PLC

(57) ABSTRACT

An information processing apparatus includes a processor configured to: detect, via a reader, a memory when placed in close proximity to the reader or when spaced apart from the reader after being in close proximity to the reader; and at each timing when the memory is detected, perform display control such that a selection element, out of multiple selection elements displayed on a display, is in a selected display state.

20 Claims, 17 Drawing Sheets

(51) Int. Cl.
*H04N 1/00* (2006.01)
*H04N 1/44* (2006.01)
*H04W 4/80* (2018.01)

(52) U.S. Cl.
CPC ..... *H04N 1/00395* (2013.01); *H04N 1/00413* (2013.01); *H04N 1/00514* (2013.01); *H04N 1/4426* (2013.01); *H04W 4/80* (2018.02); *H04N 1/00411* (2013.01)

(58) Field of Classification Search
CPC ........... H04N 1/00429; H04N 1/00432; H04N 1/00435; H04N 1/00437; H04N 1/00392; H04N 2201/006; H04W 4/80; H04M 2250/04
See application file for complete search history.

(56) References Cited

U.S. PATENT DOCUMENTS

| | | | |
|---|---|---|---|
| 2015/0331559 A1* | 11/2015 | Antonelli | G06F 3/04842 715/739 |
| 2017/0272591 A1* | 9/2017 | Odaira | H04N 1/00477 |
| 2018/0060548 A1 | 3/2018 | Yamashirodani | |
| 2021/0125450 A1* | 4/2021 | Ueno | G06Q 20/3278 |

* cited by examiner

| No. | OPERATION DETAILS | APPARATUS RECOGNITION | ACTION DETAILS |
|---|---|---|---|
| DF-1 | OPERATION OF HOLDING OVER FOR SHORTER TIME (Y SECONDS OR SHORTER) | DETECTED FOR SHORTER TIME | MOVING TENTATIVE SELECTION MARK FORWARD (AT TIMING WHEN CARD IS SPACED APART) |
| DF-2 | OPERATION OF NOT HOLDING OVER (X SECONDS) | UNDETECTED FOR LONGER TIME | SELECTION CONFIRMED |
| DF-3 | OPERATION OF HOLDING OVER FOR LONGER TIME (LONGER THAN Y SECONDS) | DETECTED FOR LONGER TIME | MOVING TENTATIVE SELECTION MARK BACKWARD (AT TIMING WHEN CARD IS SPACED APART) |

| No. | OPERATION DETAILS | APPARATUS RECOGNITION | ACTION DETAILS |
|---|---|---|---|
| UA-1 | OPERATION OF HOLDING OVER | DETECTED AT THE BEGINNING | MOVING TENTATIVE SELECTION MARK FORWARD (AT TIMING WHEN CARD IS HELD OVER) |
| UA-2 | OPERATION OF NOT HOLDING OVER (X SECONDS) | UNDETECTED FOR LONGER TIME | MOVING TENTATIVE SELECTION MARK FORWARD EVERY PREDETERMINED PERIOD OF TIME (SCROLL) |
| UA-3 | OPERATION OF HOLDING OVER FOR LONGER TIME (LONGER THAN Y SECONDS) | DETECTED FOR LONGER TIME | SELECTION CONFIRMED (AT TIMING WHEN Y SECONDS HAVE ELAPSED) |

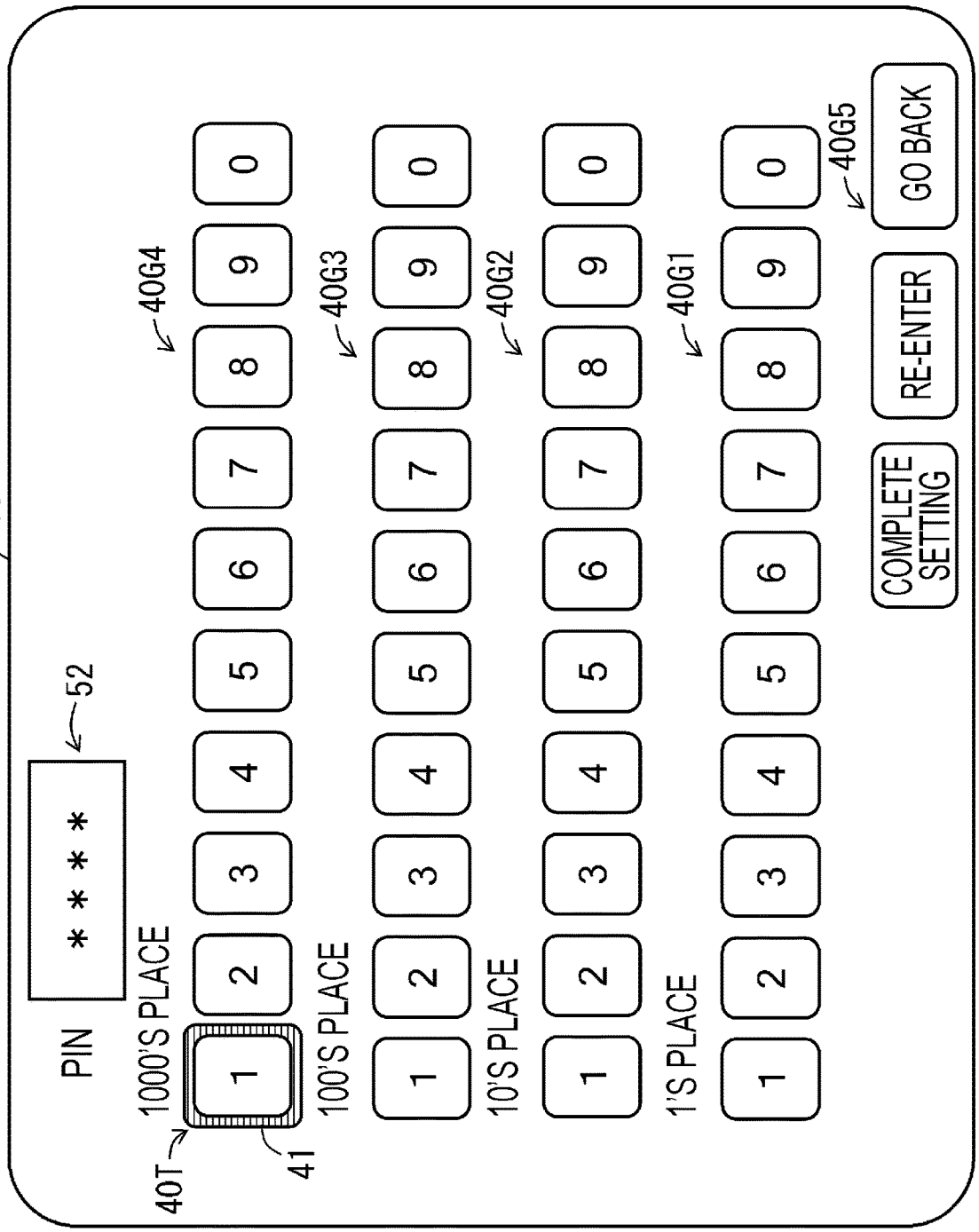

INFORMATION PROCESSING APPARATUS, NON-TRANSITORY COMPUTER READABLE MEDIUM, AND INFORMATION PROCESSING METHOD FOR SELECTION CONTROL ON DISPLAY IN NON-CONTACT MODE

CROSS-REFERENCE TO RELATED APPLICATIONS

This application is based on and claims priority under 35 USC 119 from Japanese Patent Application No. 2022-045524 filed Mar. 22, 2022.

BACKGROUND

(i) Technical Field

The present disclosure relates to an information processing apparatus, a non-transitory computer readable medium, and an information processing method.

(ii) Related Art

Information processing apparatuses having a touch panel are disclosed. Also, other information processing apparatuses (multi-function apparatuses) performing user authentication are disclosed. In these processing apparatuses, user authentication is performed by holding over a reader a memory (such as an integrated circuit (IC) card, electronic tag, or smart phone) storing authentication information, such as user identification (ID).

Japanese Unexamined Patent Application Publication No. 2018-34319 discloses an image processing apparatus, such as a multi-function apparatus. The image processing apparatus includes a card reader, an authentication processor, and a process execution unit. The card reader detects an IC card storing the authentication information (user identification (ID)) and reads the authentication information from the IC card. The authentication processor performs user authentication in accordance with the authentication information read by the card reader. The process execution unit performs a predetermined process associated with a detection pattern if the card reader detects the same IC card by several times according to the detection pattern.

Screen operation may be performed on an information processing apparatus without a user touching a display, such as a touch panel, by placing a memory (such as an IC card, electronic tag, or smart phone) in close proximity to a reader or by spacing the memory apart from the reader after placing the memory in close proximity to the reader.

SUMMARY

Aspects of non-limiting embodiments of the present disclosure relate to performing a screen operation on an information processing apparatus by placing a memory in close proximity to a reader or spacing the memory apart from the reader after placing the memory in close proximity to the reader.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: detect, via a reader, a memory when placed in close proximity to the reader or when spaced apart from the reader after being in close proximity to the reader; and at each timing when the memory is detected, perform display control such that a selection element, out of multiple selection elements displayed on a display, is in a selected display state.

BRIEF DESCRIPTION OF THE DRAWINGS

Exemplary embodiments of the present disclosure will be described in detail based on the following figures, wherein:

FIG. 5A illustrates a screen operation for default setting;

FIG. 5B illustrates a screen operation for customized setting;

FIG. 18 illustrates an example of a personal identification number (PIN) input screen for the bank ATM.

DETAILED DESCRIPTION

Overview and Definition

Figure 1:
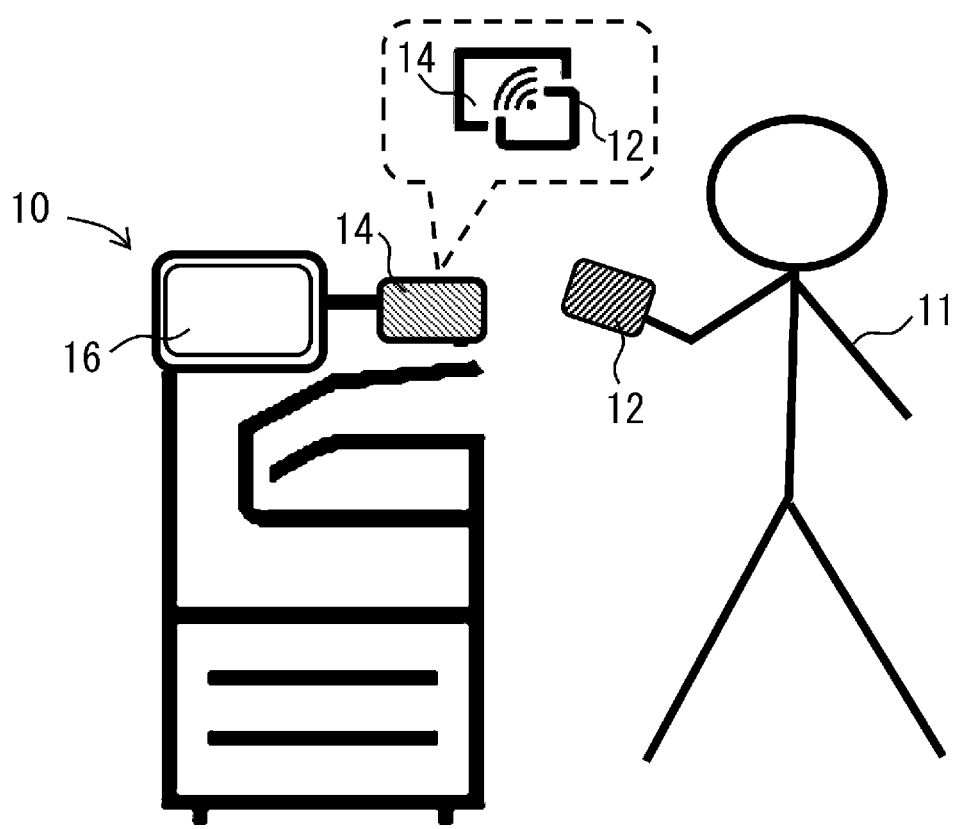
FIG. 1 schematically illustrates a multi-function apparatus as an example of an information processing apparatus.

Exemplary embodiment of the disclosure is described in detail with reference to the attached drawings. The configuration described below is cited for exemplary purposes and may be modifiable in view of specifications of an information processing apparatus. If multiple exemplary embodiments and modifications are included in the disclosure, features thereof may be combined for use. In the drawings, like elements are designated with like reference numerals and the discussion thereof is not repeated.

In the embodiment of the disclosure, a screen operation to be performed on a display on an information processing apparatus or on a display connected to the information processing apparatus is an operation to place a memory medium, such as an integrated circuit (IC) card, in close proximity to a reader, for example, by holding the memory medium over the reader or an operation to space the memory medium apart from the reader after the placement of the memory medium in close proximity to the reader. An example of the information processing apparatus includes but is not limited to a multi-function apparatus. The information processing apparatus may recognize the memory medium, such as the IC card and perform a screen operation. The information processing apparatuses may include bank automatic teller machines (ATMs), a variety of vending machines, and payment machines. The display of the information processing apparatus may be a touch panel, liquid-crystal display, organic electroluminescent (EL) display, or the like.

The memory medium includes but is not limited to an integrated circuit (IC) card having a radio-frequency (RF) tag. When the memory medium is held over a reader, the reader is able to recognize the RF tag. The memory medium may be the IC card, electronic tag, smart phone, smart watch, tablet, or the like, and each of those stores user identification information. The IC card may be an identification (ID) card, bank cash card, credit card, card storing electronic money (such as a prepaid transportation card), or the like. The memory medium may be a thing carried by a user.

The reader may be integrated with or connected to the information processing apparatus. For example, the reader includes but is not limited to a radio-frequency identifier (RFID). When the memory medium is held over the reader, the reader recognizes the memory medium. For example, by communicating with a device, such as a RF tag in the memory medium, the reader recognizes that the memory medium is held over the reader.

The information processing apparatus may perform user authentication by causing the reader to read user identification information on the memory medium. In the exemplary embodiment, user authentication may not be a requirement but, operations may still be performed on a per user basis by performing user authentication. For example, operations on the information processing apparatus may be restricted depending on user, display screen of the information processing apparatus may be differentiated from user to user, or screen operation responsive to user operation may be differentiated from user to user (see FIGS. 5A and 5B). The information processing apparatus performs user authentication at a timing when the memory medium is held over the reader. The information processing apparatus may continue performing user authentication while the memory medium remains held over the reader.

According to the exemplary embodiment of the disclosure, a processor detects the memory medium that is held over the reader or the memory medium that is spaced apart from the reader after being held over the reader. Each time the memory medium (hereinafter simply referred to as a memory) is detected, the processor performs display control such that multiple selection elements displayed side by side on a display are set to be sequentially selected. The selection elements include but are not limited to icons 40 illustrated in FIG. 7 and other figures. The selection elements are selection items displayed on the display. The selection items include a variety of related-art selection items displayed on the display. For example, the selection elements may be frames of number pads displayed on the display.

The statement that the memory is held over the reader signifies that the memory is placed in contact with the reader (a contact mode) or in close proximity to the reader (a non-contact mode). In the discussion that follows, phrase "holding the memory over" signifies that the user is holding the memory over the reader and phrase "not holding the memory over" signifies that the user is not holding the memory over the reader. Furthermore, phrase "held over" signifies that the memory is held over the recorder and phrase "not held over" signifies that the memory is not held over the reader.

Configuration of Multi-Function Apparatus

The exemplary embodiment of a multi-function apparatus 10 is described below. FIG. 1 schematically illustrates the information processing apparatus 10. The information processing apparatus 10 has a copy function, scanner function, print function, fax function, and other functions. The information processing apparatus 10 includes a reader 14 and touch panel 16 serving as a display. The reader 14 is an RFID reader and reads user identification information from an IC card 12 when the IC card 12 is held over the reader 14. When the IC card 12 is held over the reader 14, the information processing apparatus 10 performs user authentication. The touch panel 16 serves as an input unit receiving a variety of instructions from a user and also serves as a display displaying a variety of information.

The IC card 12 is a memory having an RF tag that stores user identification information. For example, the IC card 12 is an ID card carried by a user 11.

Figure 2:
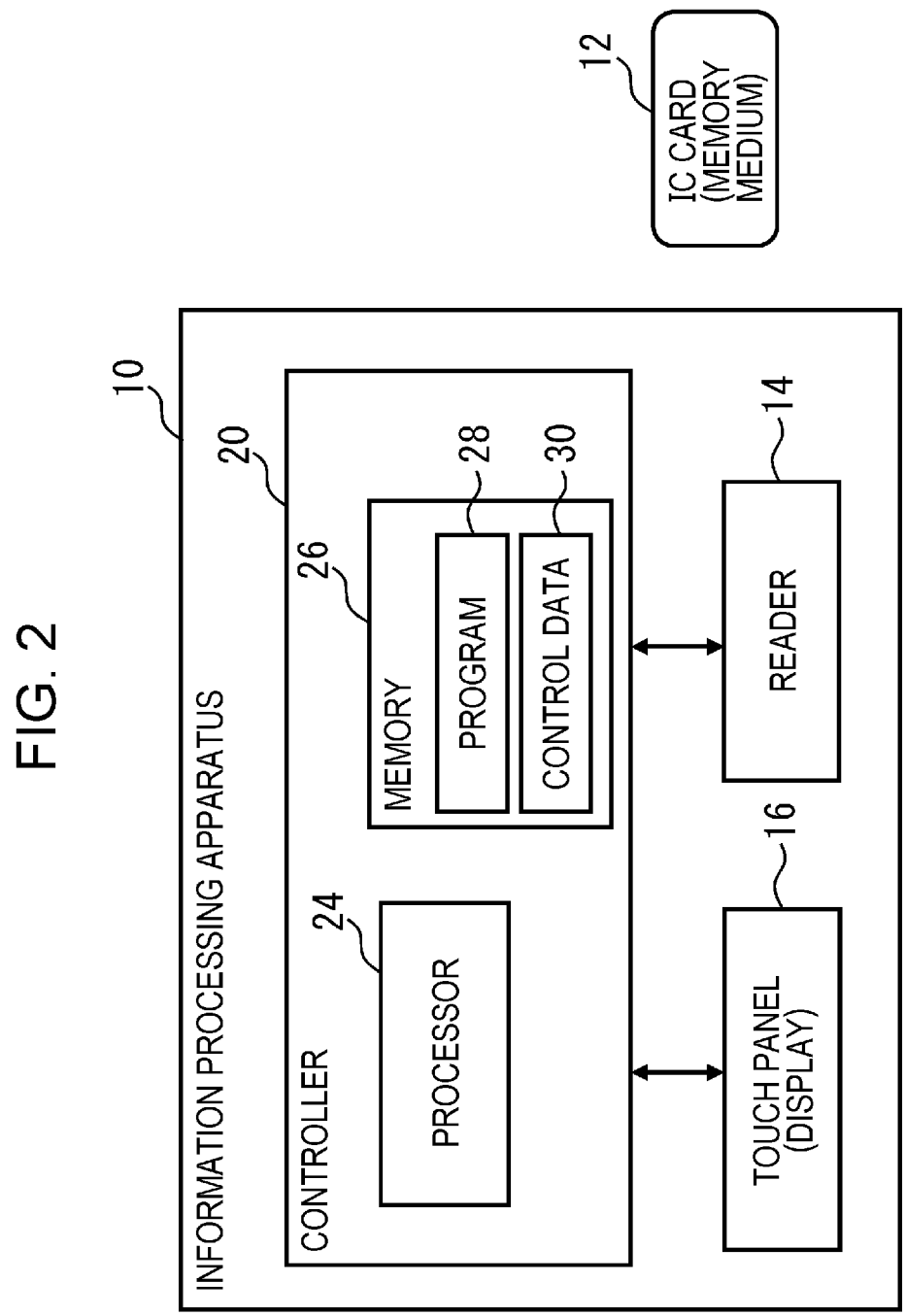
FIG. 2 is a functional block diagram illustrating major portions of the information processing apparatus related to an exemplary embodiment.

FIG. 2 is a functional block diagram of the information processing apparatus 10 illustrating major portions related to the exemplary embodiment. FIG. 2 also serves as a function block diagram of another information processing apparatus.

The information processing apparatus 10 includes a controller 20, touch panel 16, and reader 14. The controller 20 includes a processor 24 and memory 26. The processor 24 includes a central processing unit (CPU) and performs information processing in accordance with a program 28 and control data 30 installed on the information processing apparatus 10. The processor 24 may be defined as a computer in a narrow sense.

The memory 26 may include a read-only memory (ROM), random-access memory (RAM), flash memory, and/or hard disk. The memory 26 stores the program 28 and control data 30. The program 28 and control data 30 may be delivered not only via a network, such as the Internet but also via a computer-readable recording medium, such as an optical disk or universal serial bus (USB) memory.

The controller 20 is communicably connected to the touch panel 16 and reader 14. The processor 24 in the controller 20 detects via the reader 14 whether the IC card 12 is held over the reader 14 and whether the IC card 12 is spaced apart from the reader 14 after being held over the IC card 12. The processor 24 also controls a display operation of the touch panel 16.

Non-Contact Mode

Figure 3:
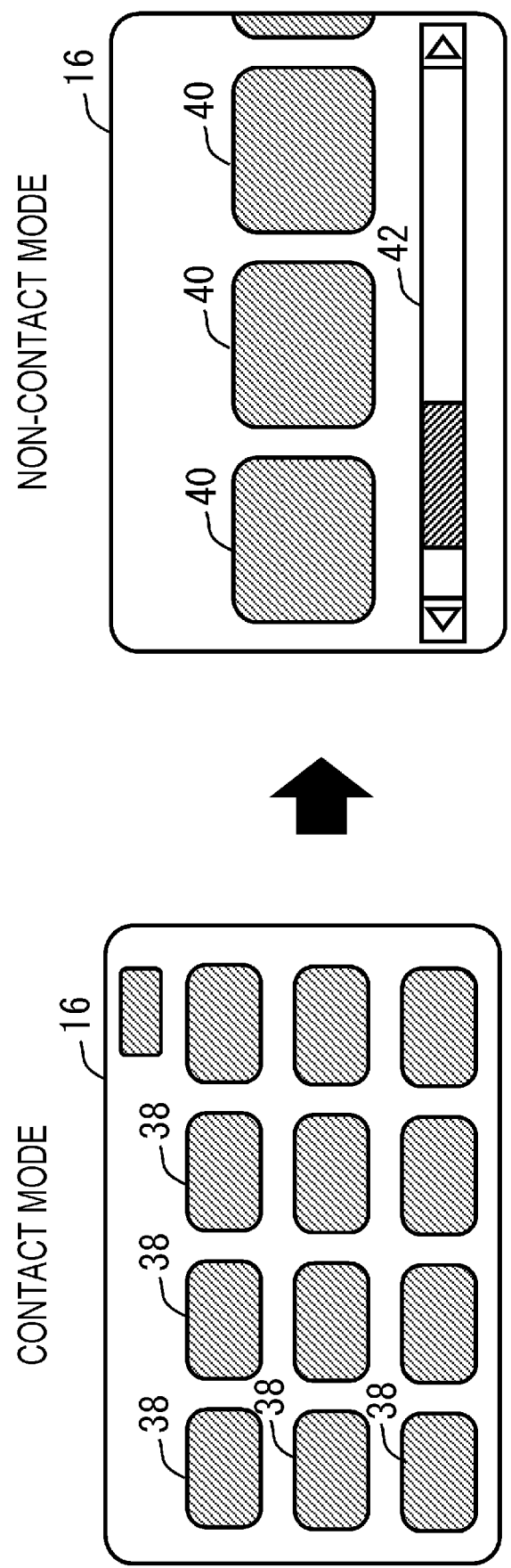
FIG. 3 schematically illustrates a contact mode and non-contact mode.
Figure 4:
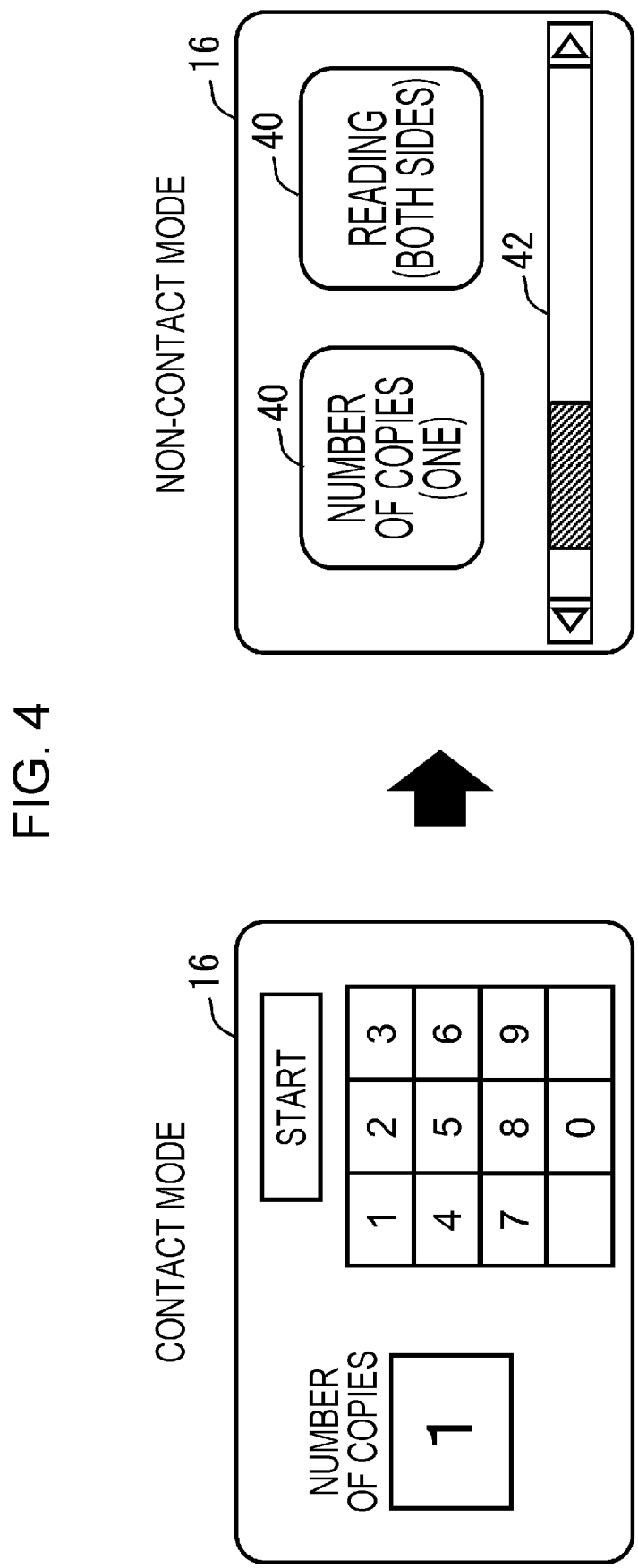
FIG. 4 schematically illustrates the contact mode and non-contact mode.

FIGS. 3 and 4 schematically illustrate touch-panel screen examples in a contact mode and non-contact mode. The information processing apparatus 10 operates in the contact mode or non-contact mode. The contact mode is a related-art technique. In the contact mode, a screen operation is performed when a user is touching the touch panel 16. The non-contact mode is a technical feature of the exemplary embodiment. In the non-contact mode, without the user touching the touch panel 16, a screen operation is performed when the IC card 12 is held over the reader 14.

In the non-contact mode, icons 40 are arranged laterally side by side as illustrated in FIGS. 3 and 4. A scroll bar 42 indicates that more icons 40 not displayed on a touch-panel screen are present. In the non-contact mode, the icons 40 may be arranged in a vertical direction or a slant direction or may be arranged in two or more rows.

Selection between the contact mode and non-contact mode is described. The information processing apparatus 10 receives an indication of the selection between the contact mode and non-contact mode, in accordance with a time duration throughout which the IC card 12 is held over the reader 14. Specifically, if the IC card 12 has been held over the reader 14 for a predetermined period of time or longer, with a default screen (not illustrated and displayed before a standard menu (FIG. 7) is displayed) displayed, the information processing apparatus 10 operates in the non-contact mode (or the contact mode); or otherwise, the information processing apparatus 10 operates in the contact mode (or the non-contact mode).

In another exemplary embodiment, the information processing apparatus 10 may receive the indication of the selection between the contact mode and non-contact mode in view of the number of times by which the IC card 12 is held over the reader 14. Specifically, if the IC card 12 is passed twice over the reader 14 with the default screen displayed, the information processing apparatus 10 operates in the non-contact mode (or the contact mode); or otherwise, the information processing apparatus 10 operates in the contact mode (or the non-contact mode). The number of passings may be twice or more.

The non-contact mode is specifically described. FIGS. 5A and 5B illustrate tables indicating the screen operations in the non-contact mode. FIG. 5A illustrates the screen operation for a default setting DF and FIG. 5B illustrates the screen operation for a customized setting UA. By pre-storing on the memory 26 information indicating which screen operation is to be applied on a per user basis, the information processing apparatus 10 may provide the screen operation having a setting associated with a corresponding user when the user is identified through user authentication of the IC card 12. FIG. 5B illustrates the screen operation for a user A.

Figure 12:
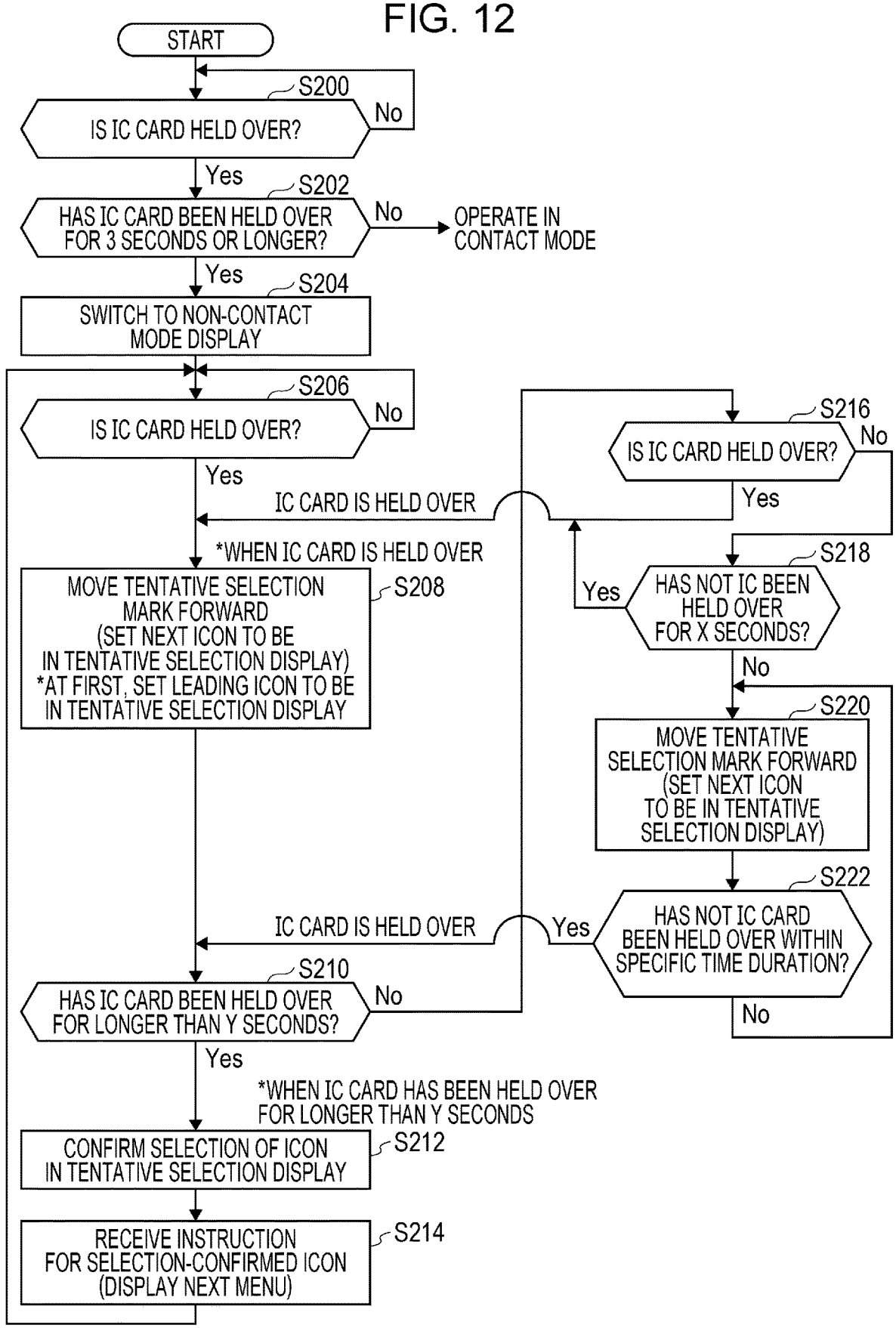
FIG. 12 is a flowchart illustrating a process of screen operations for the customized setting.

The screen operation for the default setting DF (FIG. 5A) is described with reference to a flowchart in FIG. 6 and the screen operation for the customized setting UA (FIG. 5B) is described with reference to a flowchart in FIG. 12. Screen operations of other customized setting (screen operations of first through third modifications) are also described with reference to flowcharts in FIGS. 13 through 15.

Screen Operations for Default Setting

Figure 6:
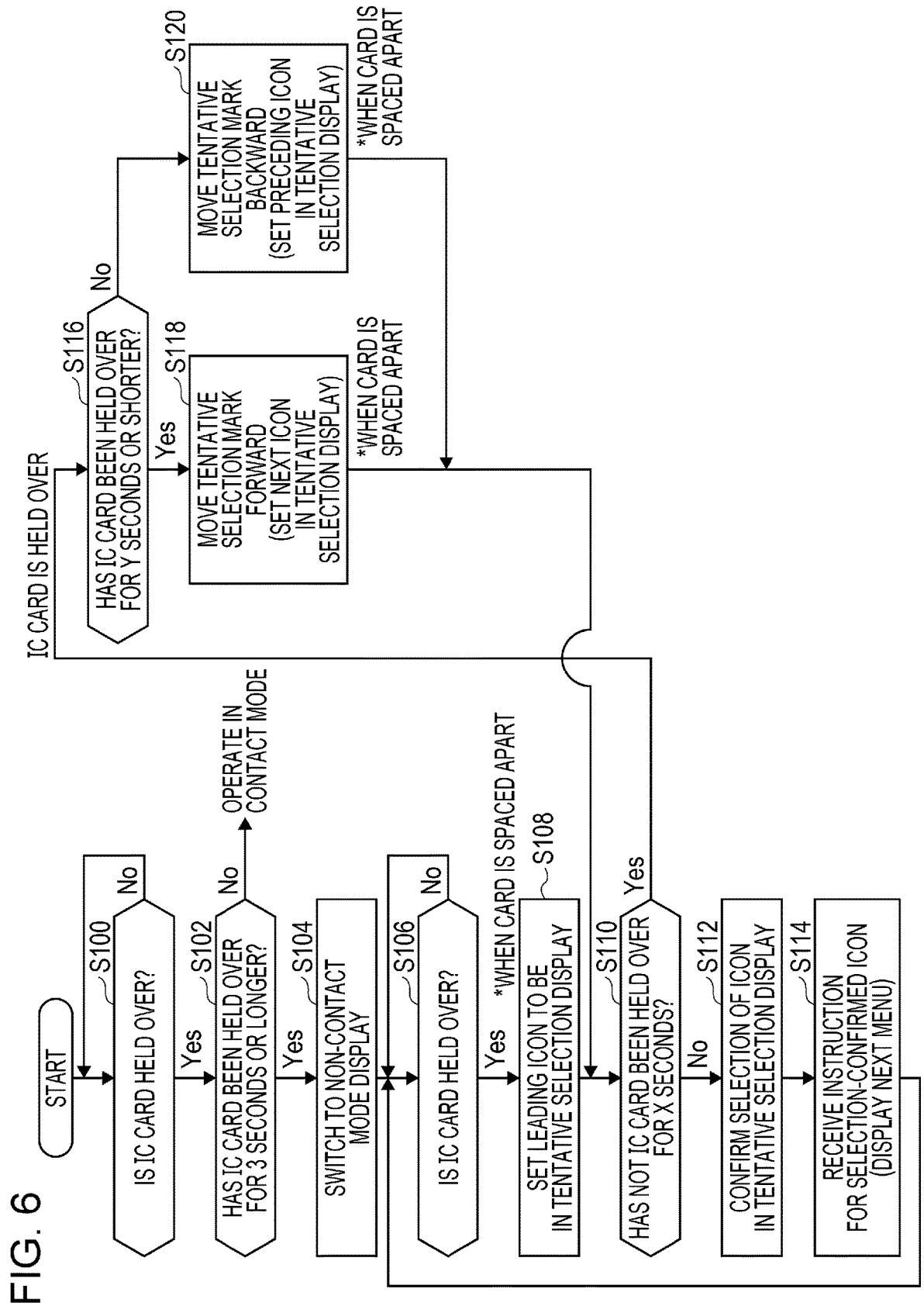
FIG. 6 is a flowchart illustrating a process of the screen operations for the default setting.

FIG. 6 is a flowchart illustrating a process of the screen operations for the default setting DF. Steps in step S100 and S102 are for a selection process selecting between the contact mode and non-contact mode. In step S100, the processor 24 in the information processing apparatus 10 determines whether the IC card 12 is held over. If the yes path is followed in S100 (the IC card 12 is held over), the process proceeds to S102. In S102, the processor 24 determines whether the IC card 12 has been held over for 3 seconds or longer. If the no path is followed in S102 (the IC card 12 has been held over for shorter than 3 seconds), the information processing apparatus 10 operates in the contact mode. On the other hand, if the yes path is followed in S102 (the IC card 12 has been held over for 3 seconds or longer), the information processing apparatus 10 operates in the non-contact mode (the process proceeds to S104).

Steps S104 and subsequent steps are a process for the non-contact mode. In S104, the processor 24 performs control to display a standard menu illustrated in FIG. 7 on the touch panel 16. In the standard menu, the icons 40 are displayed laterally side by side. At the time point of S104, a touch panel display in the top left portion of FIG. 7 appears (it is noted however that a leading icon "copy" is not in a tentative selection display 40T (described below)).

In S106, the processor 24 determines whether the IC card 12 is held over. If the yes path is followed in S106 (the IC card 12 is held over), the process proceeds to S108. In S108, the processor 24 sets the leading icon on the standard menu to a tentative selection display if the IC card 12 is spaced apart from the reader 14 after being held over the reader 14. A touch panel display in this state is illustrated in the top left portion of FIG. 7. The leading copy icon 40 is in the tentative selection display 40T (also referred to as a selected display state 40T).

The tentative selection display 40T indicates a display state indicating that an icon 40 is selected. In the exemplary embodiment, the tentative selection display 40T is in a display state where the icon 40 is surrounded by a tentative selection mark 41 having a frame shape. The tentative selection mark 41 may be filled with a conspicuous color, such as red or blue. The tentative selection mark 41 may be flashed at predetermined time intervals. The tentative selection display 40T is not limited to the tentative selection mark 41 and may be in one of a variety of display states of related art indicating that the icon 40 (selection element) is selected.

In S110, the processor 24 determines whether the IC card 12 has not been held for X seconds (predetermined period of time) since the spacing of the IC card 12 from the reader 14. If the no path is followed in S110 (the IC card 12 has not been held over, thus has been undetected for longer time), the processor 24 recognizes in S112 that the selection of the icon 40 in the tentative selection display 40T is confirmed. In S114, the processor 24 receives an instruction for the icon 40 that is selected for confirmation (hereinafter referred to as a selection-confirmed icon). For example, in view of the touch panel display in the top left portion of FIG. 7, the processor 24 recognizes that the selection of the copy icon 40 is confirmed and then receives the instruction for a copy submenu (see FIG. 8). The processor 24 controls the displaying of the copy submenu and then returns to S106.

On the other hand, if the yes path is followed in S110 (the IC card 12 is held over), the processor 24 determines in S116 whether the IC card 12 has been held over the reader 14 for Y seconds (predetermined hold time) or shorter. The processor 24 performs this determination when the IC card 12 is spaced apart from the reader 14 after the IC card 12 is held over.

If the yes path is followed in S116 (the IC card 12 has been held over for Y seconds or shorter, thus detected for shorter time), the processor 24 sets a next icon on the standard menu in a tentative selection display (moves the tentative selection mark 41 forward) in S118. The touch panel display in that state is illustrated in the top right portion of FIG. 7, and a scan icon 40 following the copy icon is set to be in the tentative selection display 40T.

If the no path is followed in S116 (the IC card 12 has been held over for longer than Y seconds, thus, detected for longer time), the processor 24 sets a preceding icon on the standard menu to be in the tentative selection display (moves the tentative selection mark 41 backward) in S120. A touch panel display in this state in a bottom left portion of FIG. 7 appears and a fax icon 40 prior to the copy icon is set to be in the tentative selection display 40T. Since the copy icon is the leading icon, the fax icon as a trailing icon on the standard menu serves as the icon prior to the copy icon and is set to be in the tentative selection display 40T.

The processor 24 returns to S110 via S118 or S120. The processor 24 determines in S110 whether the IC card 12 has not been held over the reader 14 for X seconds (predetermined period of time). If the no path is followed in S110 (the IC card 12 has not been held over, thus, has been undetected for longer time), the processor 24 recognizes that the selection of the icon 40 (scan or fax) in the tentative selection display 40T is confirmed (S112) and receives an instruction to display a submenu (not illustrated) for scan or fax (S114). The processor 24 performs control to display the submenu for scan or fax and then returns to S106.

According to the screen operations for the default setting described above (FIG. 6), the user may perform the following screen operations. By repeating the operation of holding the IC card 12 over the reader 14 for a short period of time (yes path in S116), the user moves the tentative selection mark 41 forward (in a forward direction) in display shifting in the forward rotation direction in FIG. 7 to an icon 40 the user wants to confirm (S118). When the tentative selection mark 41 is moved forward to the icon 40 the user wants to confirm, the user stops holding the IC card 12 and waits on standby (no path in S110). In this way, the selection of the desired icon 40 may be confirmed (S112).

The user may move the tentative selection mark 41 forward too much erratically. In such a case, by repeating the operation of holding the IC card 12 for a longer period of time (no path in S116), the user moves the tentative selection mark 41 backward (in a reverse direction) in the display shifting in the backward rotation direction in FIG. 7 to a desired icon 40 the user wants to confirm (S120). When the tentative selection mark 41 is moved backward to the icon 40 the user wants to confirm, the user stops holding the IC card 12 over and waits on standby (no path in S110). In this way, the selection of the desired icon 40 may be confirmed (S112).

Menu Screen

Figure 7:
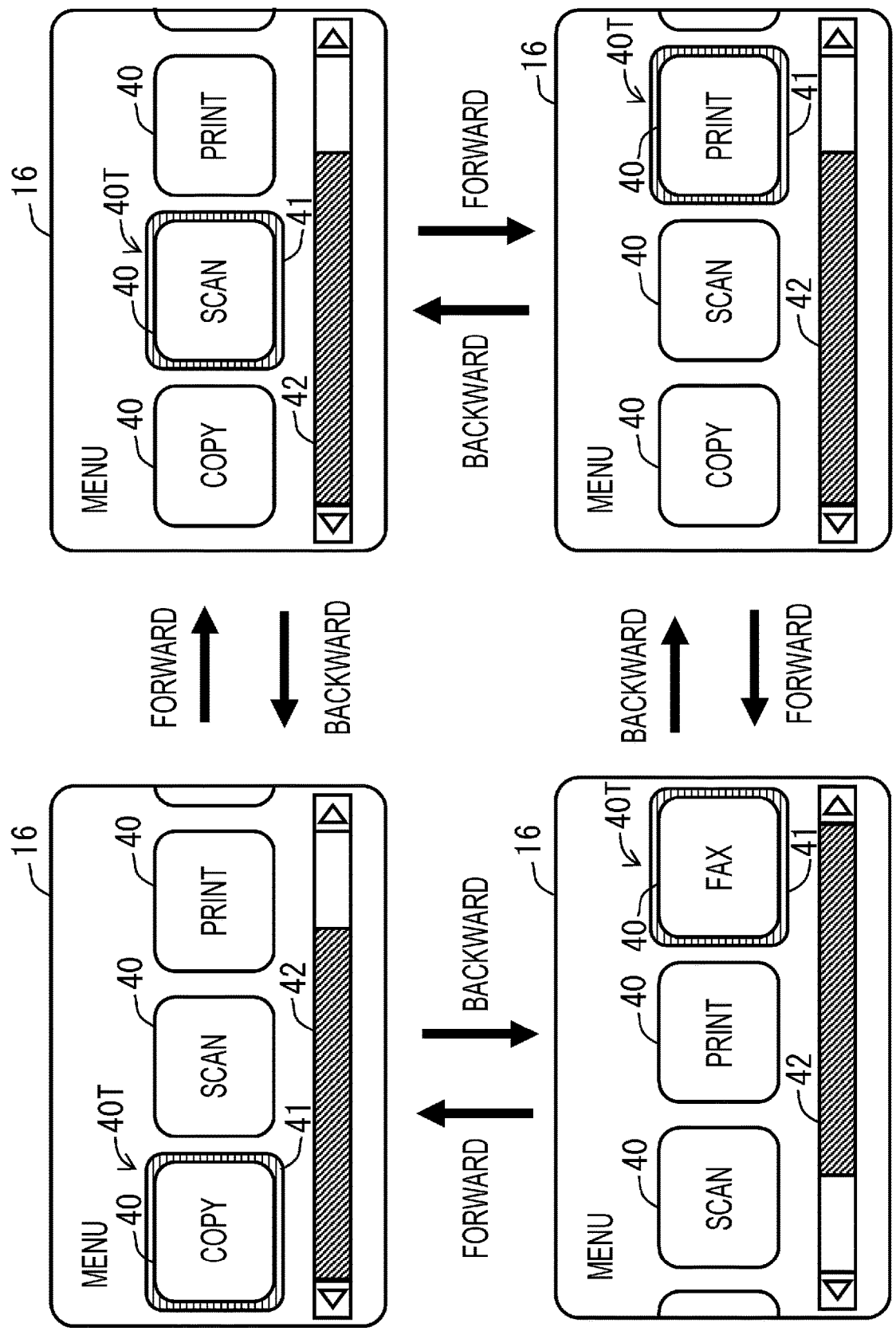
FIG. 7 illustrates an example of a standard menu screen of the multi-function apparatus.
Figure 8:
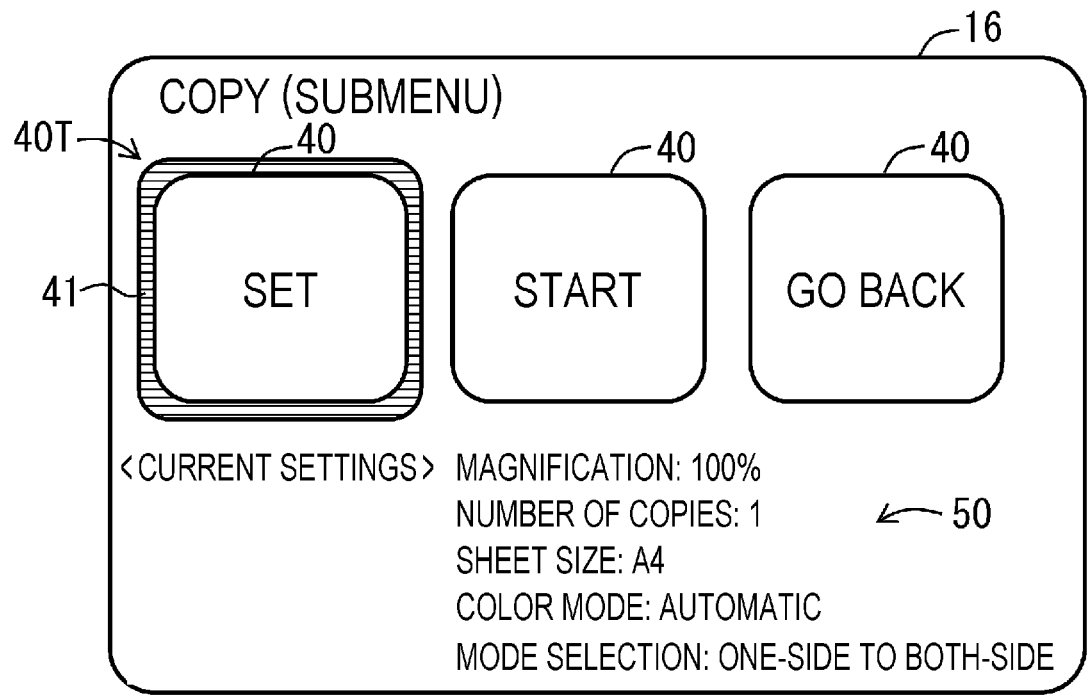
FIG. 8 illustrates an example of a sub-menu screen of the multi-function apparatus.
Figure 10:
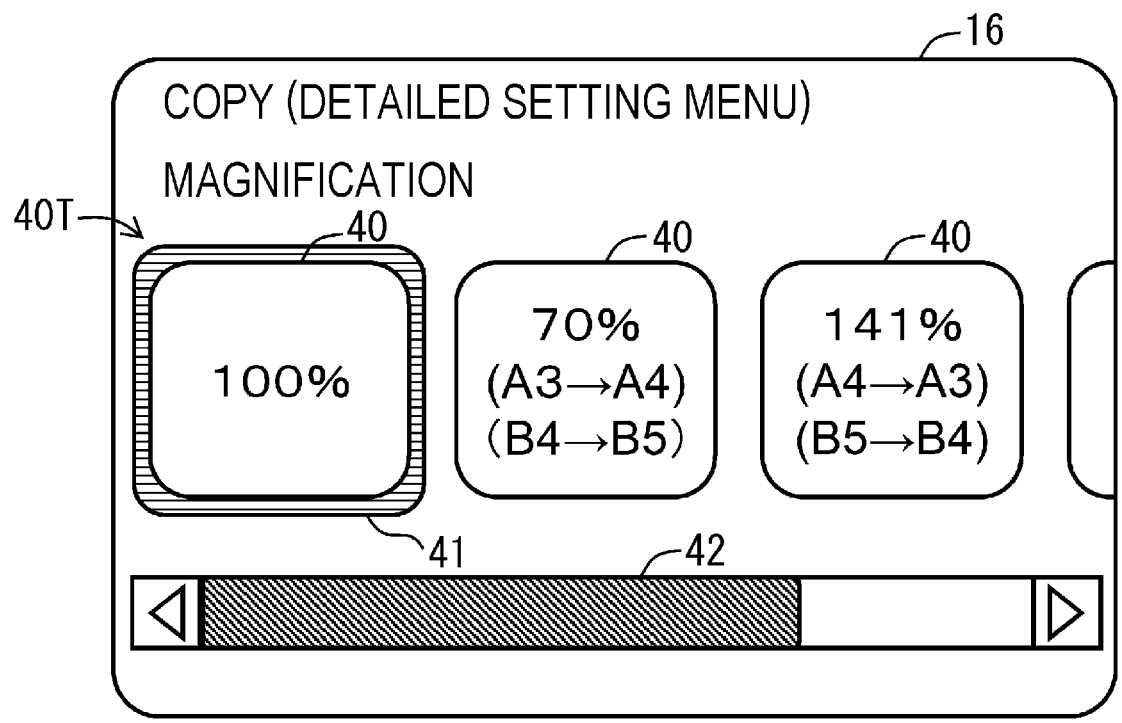
FIG. 10 illustrates an example of a detailed setting menu screen of the multi-function apparatus.
Figure 11:
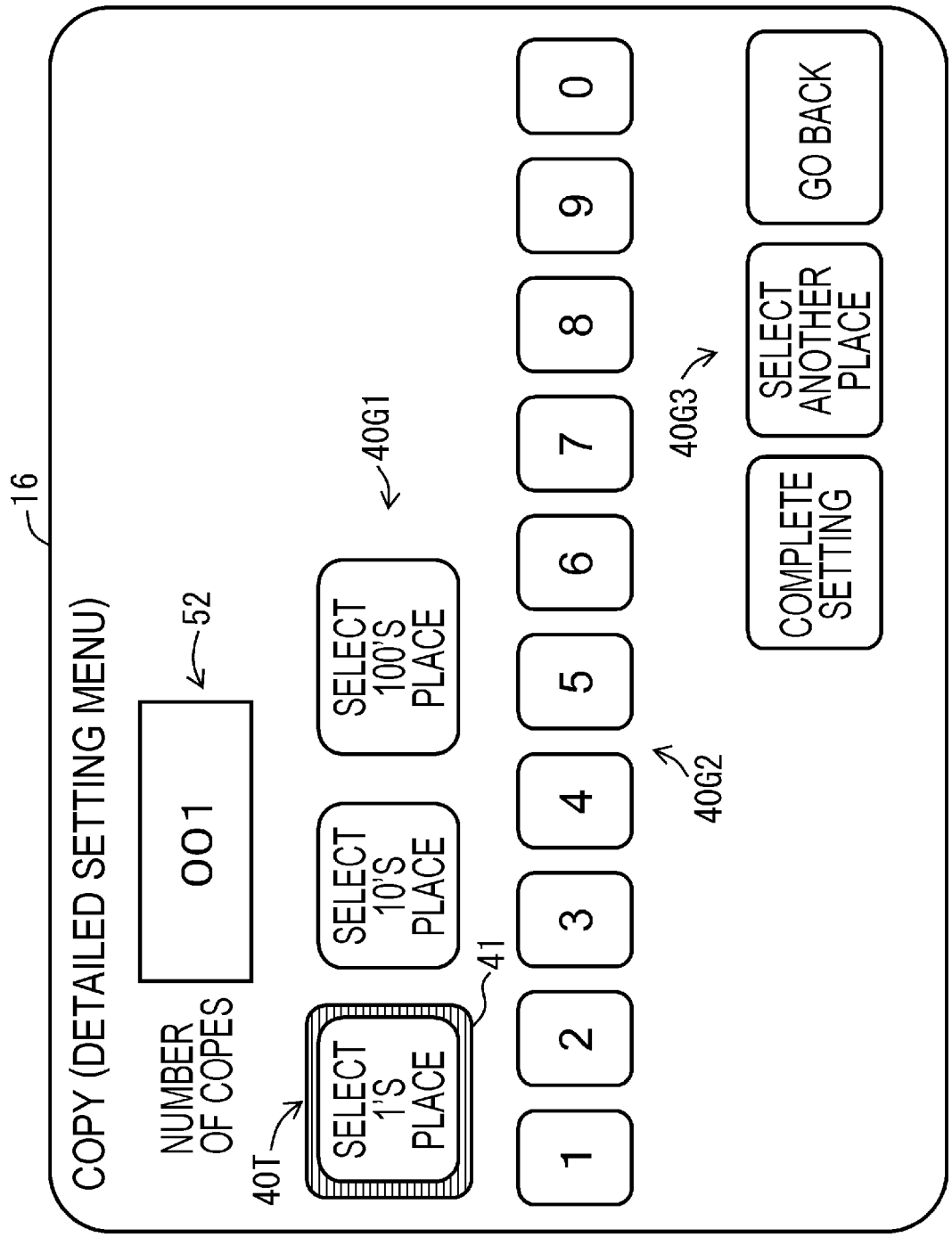
FIG. 11 illustrates another example of the detailed setting menu screen of the multi-function apparatus.

Menu screens are described below. When the selection of the icon 40 is confirmed on the standard menu (see FIG. 7), a submenu (see FIG. 8) is displayed on the touch panel 16. Referring to FIG. 8, the icons 40 are displayed laterally side by side on the submenu as well. The same is true of a setting menu (FIG. 9) and detailed setting menus (FIGS. 10 and 11). If the operations in S106 through S120 in FIG. 6 are performed on the submenu, the tentative selection of the icon 40 (movement of the tentative selection mark 41) and the confirmation of the selection of the icon 40 are performed. The same is true of the setting menu (FIG. 9) and detailed setting menus (FIGS. 10 and 11).

FIG. 8 illustrates the copy submenu. The copy submenu includes a setting icon 40, start icon 40, and go back icon 40, and setting information 50 for the current copy (for example, information on the default setting). To modify the current copy setting, the user may display a setting menu (FIG. 9) by confirming the selection of the setting icon 40. If the current copy setting is acceptable, the user moves the tentative selection mark 41 to the start icon 40 and confirms the selection. The processor 24 thus receives an instruction to execute the copying (S114 in FIG. 6). The processor 24 thus executes the copying. If the user wants to go back to the standard menu (FIG. 7), the user moves the tentative selection mark 41 to the go back icon 40 and then confirms the selection. The standard menu (FIG. 7) may thus be displayed.

Figure 9:
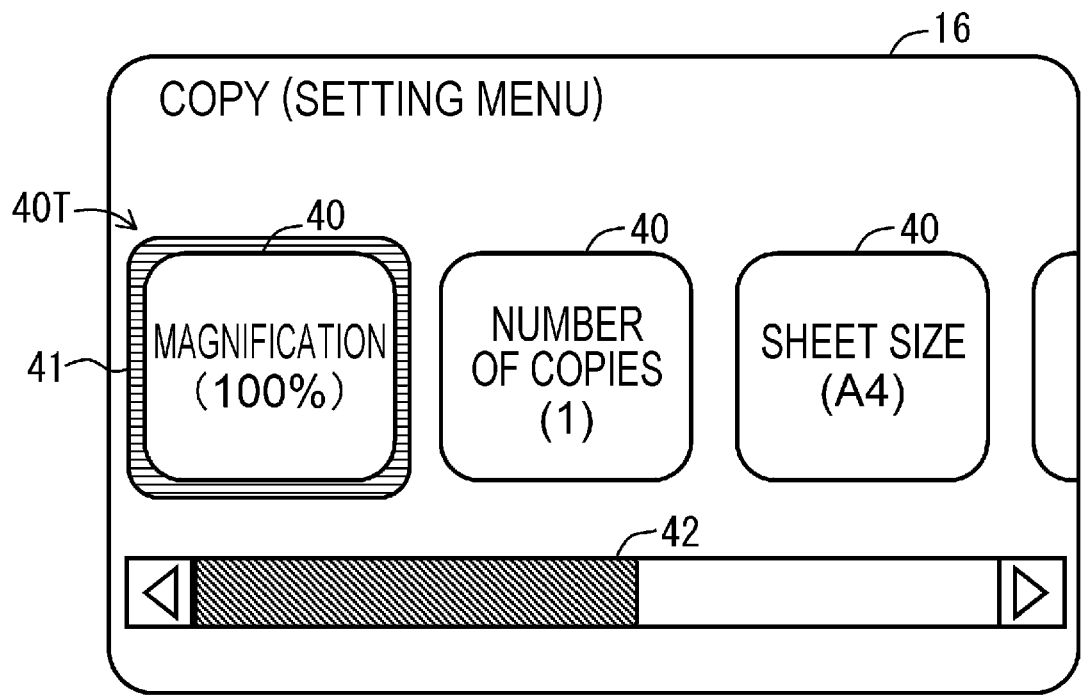
FIG. 9 illustrates an example of a setting menu screen of the multi-function apparatus.

FIG. 9 illustrates the copy setting menu that is displayed in response to the confirmation of the selection of the setting icon on the submenu (FIG. 8). The copy setting menu includes a "magnification" icon 40, "number of copies" icon 40, "sheet size" icon 40, and "go back" icon 40 (a portion of these is not illustrated). Each icon 40 includes current setting information in parentheses. The user moves the tentative selection mark 41 to the icon 40 where the user wants to modify the setting and then confirms the selection. The processor 24 thus receives an instruction to display the detailed setting menu (FIGS. 10 and 11) responsive to the selection-confirmed icon (S114 in FIG. 6). To go back to the submenu (FIG. 8), the user moves the tentative selection mark 41 to the go back icon 40 on the setting menu (FIG. 9) and then confirms the selection. The submenu (FIG. 8) is thus displayed again.

FIG. 10 illustrates the detailed setting menu for copy magnification that is displayed in response to the confirmation of the selection of the magnification icon on the setting menu (FIG. 9). The detailed setting menu includes the icons 40 for "100%," "70%," "141%," and "go back" (a portion of these is not illustrated). The user moves the tentative selection mark 41 to the icon 40 having the magnification the user wants to set and then confirms the selection. In this way, the processor 24 receives an instruction that updates copying setting information 50 (FIG. 8) to a magnification corresponding to the selection-confirmed icon (S114 in FIG. 6). The processor 24 thus updates the copying setting information 50.

FIG. 11 illustrates the detailed setting menu for the number of copies that is displayed in response to the selection confirmation of the number of copies icon on the setting menu (FIG. 9). The detailed setting menu includes an input information display screen 52, first icon group 40G1, second icon group 40G2, and third icon group 40G3. The input information display screen 52 displays numerical values that are input using the first icon group 40G1 and second icon group 40G2. The first icon group 40G1 includes icons to select 1's place, select 10's place, and select 100's place. The second icon group 40G2 includes icons for "1" through "9," and "0." The third icon group 40G3 includes icons for "complete setting," "select another place," and "go back."

With the detail setting menu in FIG. 11 displayed, the processor 24 performs control to move the tentative selection mark 41 from one icon (to select place) to another icon (to select place) in the first icon group 40G1 in response to the operation of holding the IC card 12. After the selection of the icon (to select place) in the first icon group 40G1 is confirmed, the processor 24 performs control to move the tentative selection mark 41 from one icon (numerical value) to another in the second icon group 40G2 when the operation of holding the IC card 12 over the reader 14 is performed. The numerical value selected in the second icon group 40G2 is a numerical value at the place that is selection-confirmed in the first icon group 40G1. After the icon (numerical value) in the second icon group 40G2 is selection-confirmed, the processor 24 performs control to move the tentative selection mark 41 from one icon to another in the third icon group 40G3 in response to the operation of holding the IC card 12 over the reader 14.

The user confirms the selection of the place desired to be modified in the first icon group 40G1, the selection of the numerical value at that place in the second icon group 40G2, and the selection of the "complete setting" icon in the third icon group 40G3. When the selection of the icon is confirmed in the second icon group 40G2, the processor 24 updates the numerical value in the input information display screen 52. When the selection of the complete setting icon is confirmed in the third icon group 40G3, the processor 24 receives an instruction to update the copying setting information 50 (FIG. 8) to the number of copies displayed in the input information display screen 52 (S114 in FIG. 6). The processor 24 updates the copying setting information 50. If the selection of the "select another place" icon is confirmed in the third icon group 40G3, the user may modify the numerical value at another place displayed in the input information display screen 52. Specifically, if the selection of the select another place icon is confirmed, the processor 24 performs control to move the tentative selection mark 41 from one icon (to select place) to another in the first icon group 40G1 in response to the operation of holding the IC card 12 over the reader 14. The inputting of the numerical values may be performed on a screen having "1" through "9" icons and "0" icon arranged at each place of the numerical value as described below with reference to FIG. 18 (PIN input screen on bank automatic teller machine (ATM)).

According to the exemplary embodiment described above, the operation of holding the IC card 12 over the reader 14 may perform the following operations in a flexible manner, including transitioning the menu screen, inputting the setting information, and performing the processes described above.

Screen Operations for Customized Setting

The screen operations for the customized setting UA (FIG. 5B) are described below. FIG. 12 is a flowchart illustrating the process for the screen operations for the customized setting UA. Operations in S200 through S204 are respectively identical to the operations in S100 through S104 in FIG. 6 and the discussion thereof is omitted herein. At the time point in S204, the touch panel display in the top left portion of FIG. 7 appears (it is noted however that the leading icon "copy" is not in the tentative selection display 40T).

In S206, the processor 24 determines whether the IC card 12 is held over. If the yes path is followed in S206 (with the IC card 12 held over), the process proceeds to S208. If the IC card 12 is held over (detected at the beginning), the processor 24 sets the leading icon on the standard menu to be in the tentative selection display in S208. The touch panel display in that state is displayed in the top left portion of FIG. 7 and the leading copy icon 40 is in the tentative selection display 40T.

In S210, the processor 24 determines whether the hold time of the IC card 12 in the yes path in S206 exceeds Y seconds (predetermined hold time). If the yes path is followed in S210 (the IC card 12 has been held over for longer than Y seconds, thus detected for longer time) and when the hold time of the IC card 12 exceeds Y seconds, the processor 24 recognizes in S212 that the selection of the icon 40 in the tentative selection display 40T is confirmed. In S214, the processor 24 receives an instruction for the selection-confirmed icon 40. For example, with the touch panel display in the top left portion of FIG. 7 displayed, the processor 24 recognizes that the selection of the copy icon 40 is confirmed and thus receives an instruction to display the submenu for copying (see FIG. 8). The processor 24 performs control to display the submenu for the copying and then returns to S206.

If the no path is followed in S210 (the hold time is shorter than Y seconds), the processor 24 determines again whether the IC card 12 is held over. If the yes path is followed in S216 (with the IC card 12 held over), the processor 24 sets a next icon on the standard menu to be in the tentative selection display (moves the tentative selection mark 41 forward) in S208 when the IC card 12 is held over (detected at the beginning). The touch panel display in that state is illustrated in the top right portion of FIG. 7 and the scan icon 40 subsequent to the copy icon is set in the tentative selection display 40T. If the hold time of the IC card 12 in the yes path in S216 exceeds Y seconds (predetermined hold time) (yes path in S210), the processor 24 recognizes that the section of the icon 40 in the tentative selection display 40T has been recognized (S212) and thus receives an instruction for the selection-confirmed icon 40 (S214).

If the no path is followed in S216 (the IC card 12 is not held over), the processor 24 determines in S218 whether the IC card 12 has not been held over the reader 14 for X seconds (predetermined period of time). If the yes path is followed in S218 (the IC card 12 is held over), the process proceeds to S208. On the other hand, if the no path is followed in S218 (the IC card 12 is not held over, undetected for longer time), the process proceeds to S220.

In S220, the processor 24 sets a next icon on the standard menu to be in the tentative selection display (moves the tentative selection mark 41 forward). Specifically, the processor 24 automatically moves the tentative selection mark 41 forward by one step although the IC card 12 is not held over. After automatically moving the tentative selection mark 41 forward (S220), the processor 24 determines in S222 whether the IC card 12 has not been held over for a specific time duration. If the no path is followed in S222 (the IC card 12 is not held over), the processor 24 moves the tentative selection mark 41 forward by one step again in S220. In this way, the tentative selection mark 41 is automatically moved forward by one step every specific time duration.

If the yes path is followed in S222 (the IC card 12 is held over), the process proceeds to S210. In S210, the processor 24 determines whether the hold time of the IC card 12 in the yes path in S222 exceeds Y seconds (predetermined hold time). If the yes path is followed in S210 (the IC card 12 has been held over for longer than Y seconds, thus, has been detected for longer time), the processor 24 recognizes that the selection of the icon 40 in the tentative selection display 40T is confirmed (S212) and then receives an instruction for the selection-confirmed icon 40 (S214).

In accordance with the screen operations for the customized setting (FIG. 12), the user may perform the screen operations described below. By repeating the operation of holding the IC card 12 (yes path in S206 and yes path in S216), the user moves the tentative selection mark 41 forward to the icon 40 the user wants to select for confirmation in the display shifting in the forward rotation direction in FIG. 7 (S208). When the tentative selection mark 41 is moved forward to the icon 40 the user wants to select for confirmation, the user still continues to hold the IC card 12 over (yes path in S210). In this way, the desired icon 40 may be selected for confirmation (S212).

The user automatically moves the tentative selection mark 41 forward every specific time duration by waiting on standby without holding the IC card 12 over (S220 and S222). When the tentative selection mark 41 has moved forward to the icon 40 the user wants to select for confirmation, the user continues to hold the IC card 12 over (yes path in S222 and yes path in S210). In this way, the selection of the desired icon 40 may be confirmed (S212).

Screen Operations of First Modification

Figure 13:
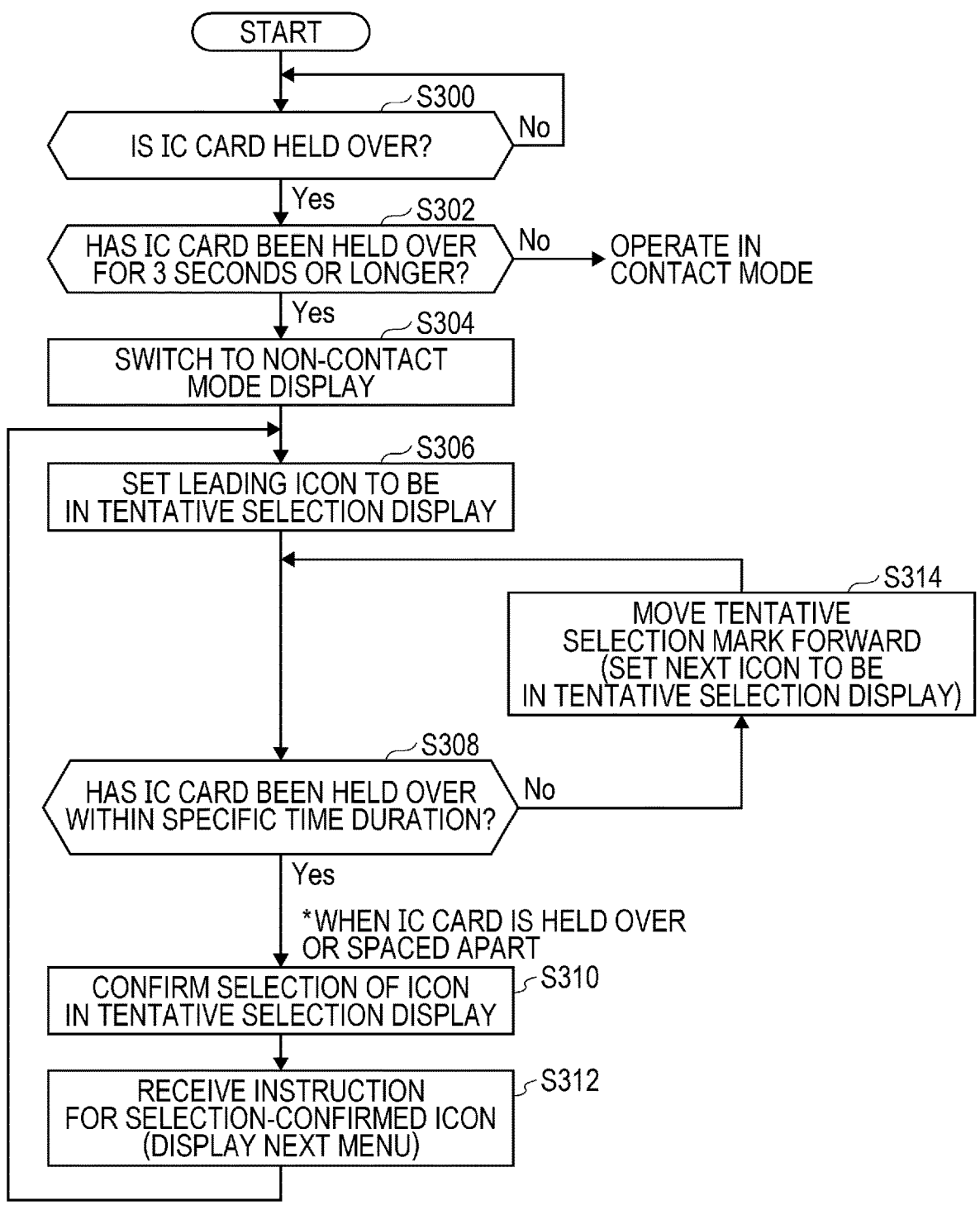
FIG. 13 is a flowchart illustrating a process of the screen operations of a first modification.

Screen operations of a first modification of the exemplary embodiment are described below. FIG. 13 is a flowchart illustrating the process of the screen operations of the first modification. Operations in S300 through S304 are respectively identical to the operations in S100 through S104 in FIG. 6 and the discussion thereof is omitted herein. At the time point of S304, the touch panel display in the top left portion of FIG. 7 appears (the leading copy icon is not in the tentative selection display 40T).

In S306, the processor 24 sets the leading icon on the standard menu to be in the tentative selection display. The touch panel display in that state is illustrated in the top left portion of FIG. 7 and the leading copy icon 40 is in the tentative selection display 40T.

In S308, the processor 24 determines whether the IC card 12 is held over within a specific time duration from when the leading icon is set to be in the tentative selection display (S306). If the yes path is followed in S308 (the IC card 12 is held over), the process proceeds to S310. When the IC card 12 is held over the reader 14 (detected at the beginning) or when the IC card 12 is spaced apart from the reader 14, the processor 24 recognizes in S310 that the selection of the icon 40 in the tentative selection display 40T is confirmed. In S312, the processor 24 receives an instruction for the selection-confirmed icon 40. For example, in view of the touch panel display in the top left portion of FIG. 7, the processor 24 recognizes that the selection of the copy icon 40 is confirmed and thus receives an instruction to display the submenu for the copying (see FIG. 8). The processor 24 performs control to display the copy submenu and then returns to S306.

If the no path is followed in S308 (the IC card 12 is not held over), the process proceeds to S314. In S314, the processor 24 sets a next icon on the standard menu to be in the tentative selection display (moves the tentative selection mark 41 forward). Specifically, the processor 24 automatically moves the tentative selection mark 41 forward by one step although the IC card 12 is not held over. The touch panel display in this state is illustrated in the top right portion of FIG. 7 and a scan icon 40 subsequent to the copy icon is set to be in the tentative selection display 40T.

In S308, the processor 24 determines whether the IC card 12 is held over within the specific time duration after automatically moving the tentative selection mark 41 forward (S314). If the no path is followed in S308 (the IC card 12 is not held over), the processor 24 moves the tentative selection mark 41 by one step forward again in S314. In this way, the processor 24 automatically moves the tentative selection mark 41 forward by one step every specific time duration.

If the processor 24 determines in S308 that the IC card 12 is held over (yes path in S308), the processor 24 recognizes that the selection of the icon 40 in the tentative selection display 40T is confirmed (S310) and receives an instruction for the selection-confirmed icon 40 (S312).

The screen operations of the first modification (FIG. 13) have been described above. The user may thus perform the screen operations described below. Without holding the IC card 12 over, the user automatically moves the tentative selection mark 41 forward every specific time duration by waiting on standby (no path in S308 and S314). When the tentative selection mark 41 advances to the icon 40 the user wants to select for confirmation, the user holds the IC card 12 (yes path in S308). In this way, the user may confirm the selection of the desired icon 40 (S312).

Screen Operations of Second Modification

Figure 14:
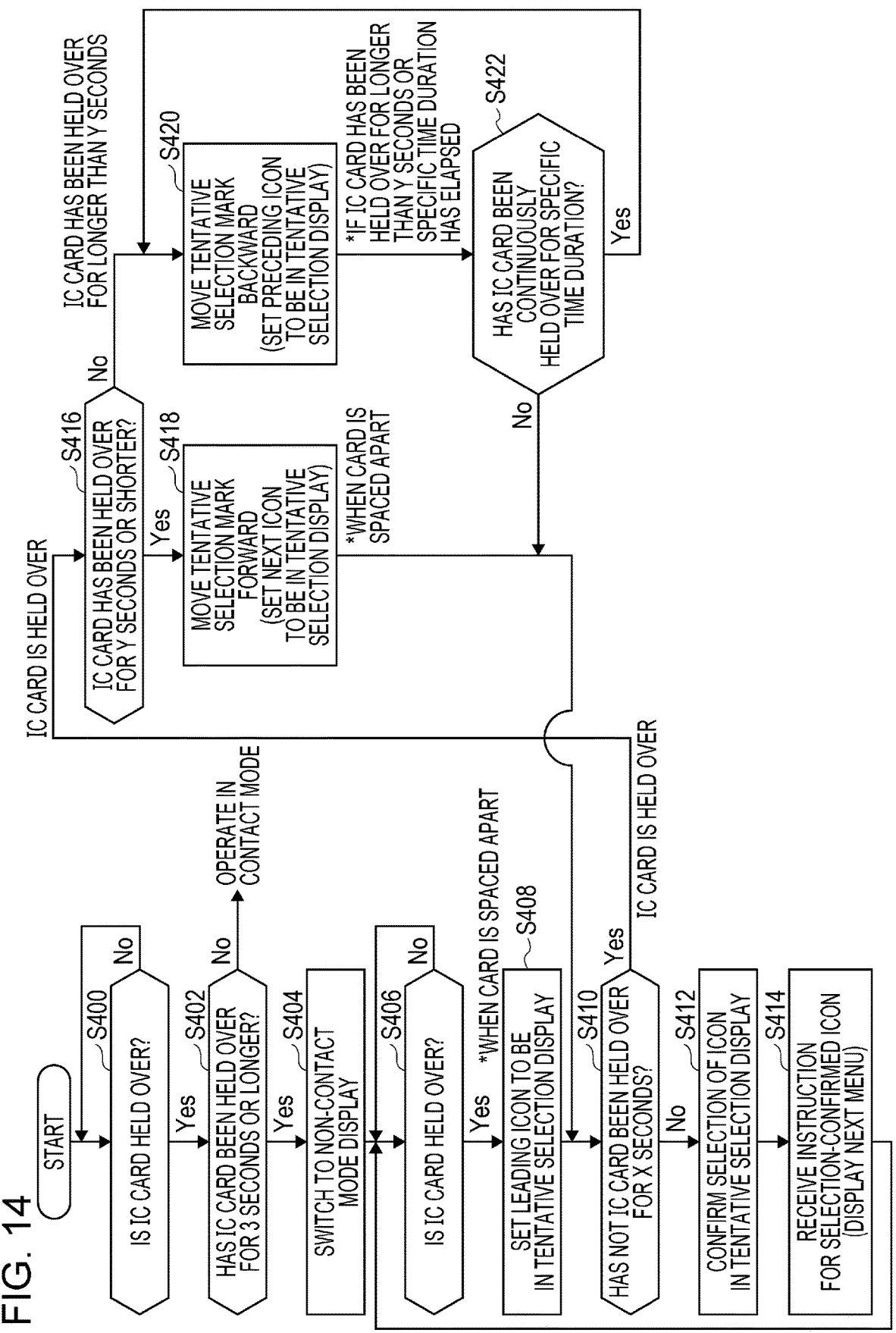
FIG. 14 is a flowchart illustrating a process of the screen operations of a second modification.

Screen operations of a second modification are described below. FIG. 14 is a flowchart illustrating a process of screen operations of the second modification. The screen operations of the second modification are identical to the screen operations of the default setting illustrated in FIG. 6 except that the tentative selection mark 41 is moved backward in the second modification (S120 is replaced with S420 and S422 in FIG. 14). Operations in S400 through S414 are respectively identical to operations in S100 through S114 and the discussion thereof is omitted herein.

In S416, the processor 24 determines whether the IC card 12 has been held over the reader 14 for Y seconds (predetermined hold time) or shorter. If the yes path is followed in S416 (Y seconds or shorter, thus detected shorter time), the processor 24 sets a next icon on the standard menu to be in the tentative selection display (moves the tentative selection mark 41 forward) in S418.

On the other hand, if the no path is followed in S416 (the IC card 12 has been held over for longer than Y seconds, thus, detected for longer time), the process proceeds to S420. In S420, when the hold time of the IC card 12 exceeds Y seconds, the processor 24 sets a preceding icon on the standard menu to be in the tentative selection display (moves the tentative selection mark 41 backward). In S422, the processor 24 determines whether the IC card 12 has been continuously held over for a specific time duration since the automatic backward movement of the tentative selection mark 41 (S420). If the yes path is followed in S422 (the IC card 12 has been continuously held over), the processor 24 moves the tentative selection mark 41 backward by one step again (S420). In this way, the processor 24 automatically moves the tentative selection mark 41 backward by one step every specific time duration.

If the IC card 12 is spaced apart from the reader 14 in S422 (no path in S422), the process proceeds to S410. If the IC card 12 has not been held over the reader 14 for X seconds (predetermined period of time) since the spacing of the IC card 12 from the reader 14 (no path in S410), the processor 24 recognizes that the selection of the desired icon 40 currently in the tentative selection display 40T is confirmed (S412). In S414, the processor 24 receives an instruction for the selection-confirmed icon 40.

The screen operations of the second modification (FIG. 14) have been described. The user may perform the screen operations described below. By continuously holding the IC card 12, the user automatically moves the tentative selection mark 41 backward in the display shifting in the backward rotation direction in FIG. 7 every specific time duration to the desired icon 40 the user wants to select for confirmation (moves the tentative selection mark 41 in the reverse direction) (S420 and S422). When the tentative selection mark 41 is moved backward to the icon 40 the user want to select for confirmation, the user may stop holding the IC card 12 over and waits on standby (no path in S422 and no path in S410). In this way, the selection of the desired icon 40 may be confirmed (S412).

Screen Operations of Third Modification

Figure 15:
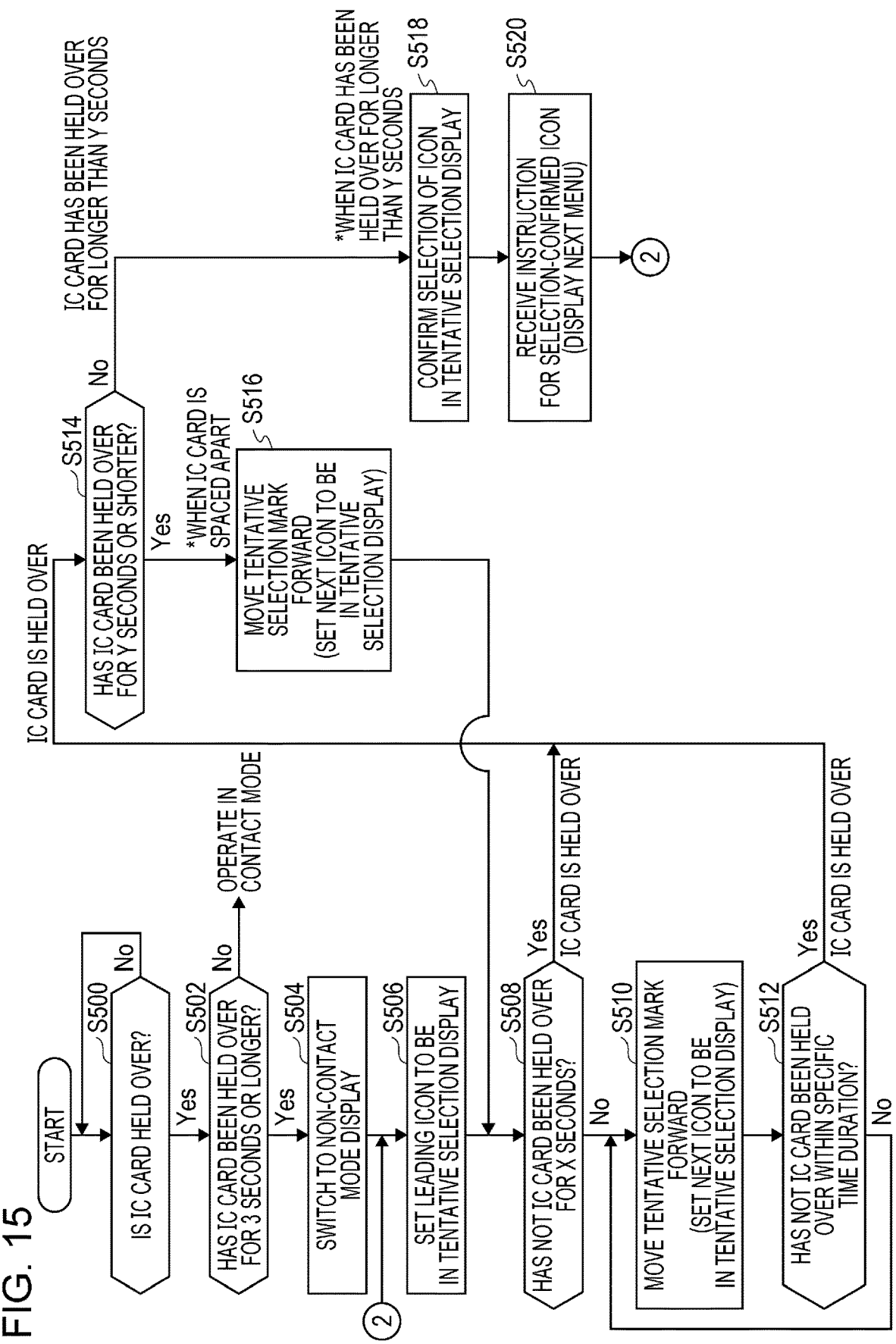
FIG. 15 is a flowchart illustrating a process of the screen operations of a third modification.

Screen operations of a third modification are described below. FIG. 15 is a flowchart illustrating a process of the screen operations of the third modification. Operations in S500 through S504 are respectively identical to operations in S100 through S104 in FIG. 6, and the discussion thereof is omitted herein. At the time point of S504, the touch panel display in the top left portion of FIG. 7 appears (the leading copy icon is not in the tentative selection display 40T).

In S506, the processor 24 sets the leading icon on the standard menu to be in the tentative selection display. The touch panel display in this state in the top left portion of FIG. 7 is displayed and the leading copy icon 40 is in the tentative selection display 40T.

In S508, the processor 24 determines whether the IC card 12 has not been held over the reader 14 for X seconds (predetermined period of time). If the no path is followed in S508 (the IC card 12 has not been held over, thus has been undetected for longer time), the process proceeds to S510.

In S510, the processor 24 sets a next icon on the standard menu to be in the tentative selection display (moves the tentative selection mark 41 forward). Specifically, although the IC card 12 is not held over, the processor 24 automatically moves the tentative selection mark 41 forward by one step. In S512, the processor 24 determines whether the IC card 12 has not held over within the specific time duration since the automatic forward movement of the tentative selection mark 41 (S510). If the no path is followed in S512 (the IC card 12 is not held over), the processor 24 moves the tentative selection mark 41 forward by one step again in S510. In this way, the processor 24 automatically moves the tentative selection mark 41 forward by one step every specific time duration.

If the yes path is followed in S508 or S512 (the IC card 12 is held over), the process proceeds to S514. In S514, the reader 14 determines whether the IC card 12 has been held over the reader 14 for Y seconds (predetermined hold time) or shorter. If the yes path is followed in S514 (the IC card 12 has been held over for Y seconds or shorter, thus, has been detected for shorter time), the processor 24 sets a next icon on the standard menu to be in the tentative selection display in S516 (moves the tentative selection mark 41 forward) when the IC card 12 is spaced apart from the reader 14. The process returns to S508.

On the other hand, if the no path is followed in S514 (the IC card 12 has been held over the reader 14 for longer than Y seconds, thus, has been detected for longer time), the process proceeds to S518. If the hold time of the IC card 12 exceeds Y seconds, the processor 24 recognizes that the selection of the icon 40 currently in the tentative selection display 40T is confirmed. In S520, the processor 24 receives an instruction for the selection-confirmed icon 40. For example, with the touch panel display in the top left portion of FIG. 7 displayed, the processor 24 recognizes that the selection of the copy icon 40 is confirmed and receives an instruction to display the copy submenu (see FIG. 8). The processor 24 performs control to display the copy submenu and then returns to S506.

In accordance with the screen operations of the third modification (FIG. 15), the user may perform the following screen operations. By waiting on standby without holding the reader 14 over, the user automatically moves every specific time duration the tentative selection mark 41 forward to the icon 40 the user wants to select for confirmation in the display shifting in the forward rotation direction in FIG. 7 (S510 and S512). By repeating the operation of holding the IC card 12 over for a short period of time (yes path in S514 and S516), the user moves the tentative selection mark 41 forward to the icon 40 the user wants to select for confirmation (moves the tentative selection mark 41 in the forward direction). When the tentative selection mark 41 moves forward to the desired icon 40 the user wants to select for confirmation, the user still continues to hold the IC card 12 over (no path in S514). In this way, the selection of the desired icon 40 may thus be confirmed (S518).

Other Information Processing Apparatuses

Figure 16:
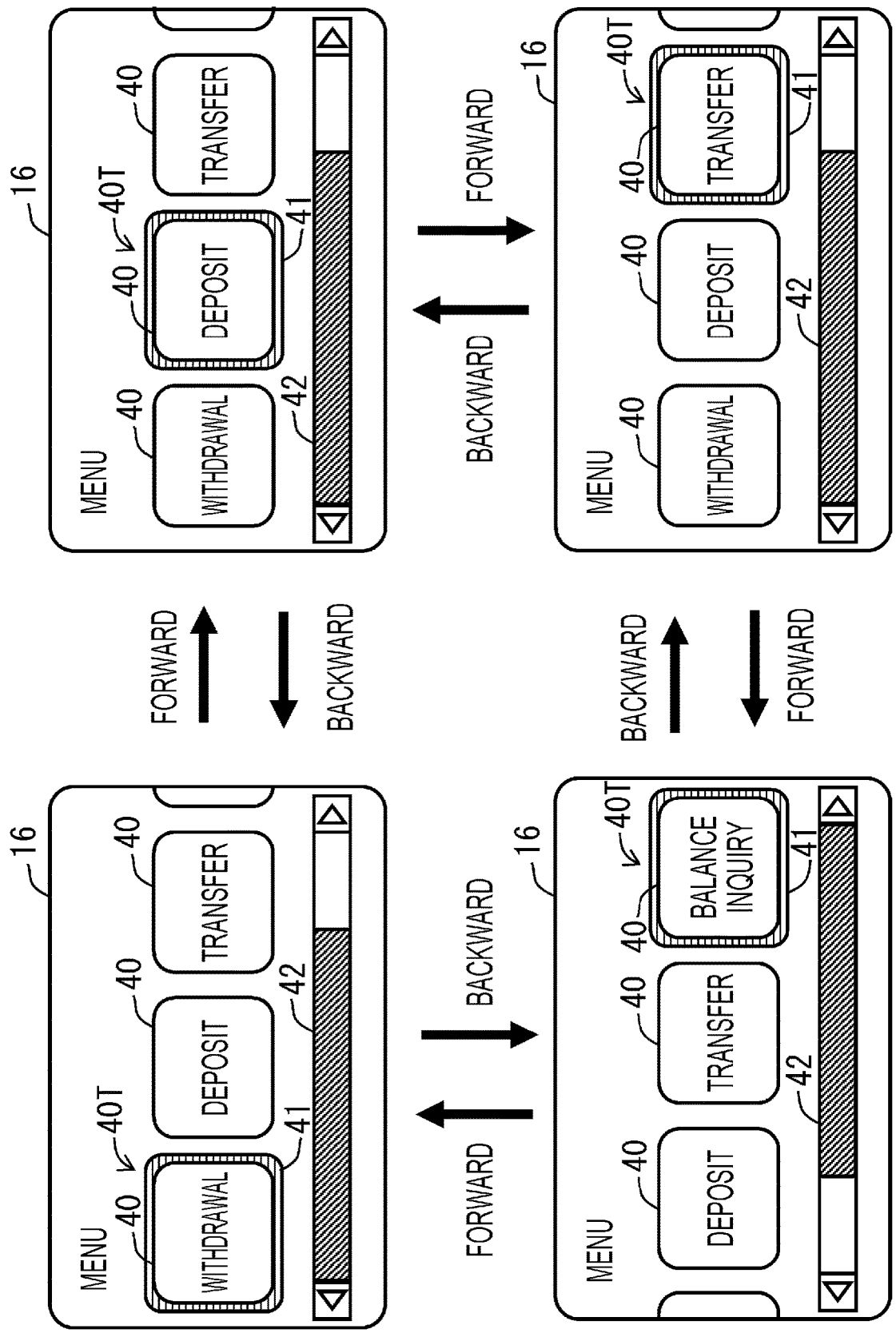
FIG. 16 illustrates an example of the standard menu screen for a bank automatic teller machine (ATM)

In the exemplary embodiment described above, the information processing apparatus is the multi-function apparatus 10. Other examples of the information processing apparatus may be a bank automatic teller machine (ATM) (FIG. 16), railroad ticket vending machine (FIG. 17), or the like. FIG. 16 illustrates an example of a standard menu screen of the bank ATM and corresponds to the standard menu screen of the multi-function apparatus 10 in FIG. 7. The standard menu includes "withdrawal," "deposit," "transfer," and "balance inquiry" icons 40. The bank ATM includes a touch panel and reader. With a cash card as a memory held over the reader of the bank ATM, the tentative selection mark 41 is moved to one of the icons 40 displayed on the touch panel and a selected icon 40 is thus confirmed in the same way as described with reference to the exemplary embodiment. In related art bank ATMs, the user may touch an icon with a finger to display a variety of menus (switches from one menu to another) and input a variety of information. According to the exemplary embodiment, switching of the menus and inputting of the variety of information may be performed by an operation of holding the cash card over the reader.

Figure 17:
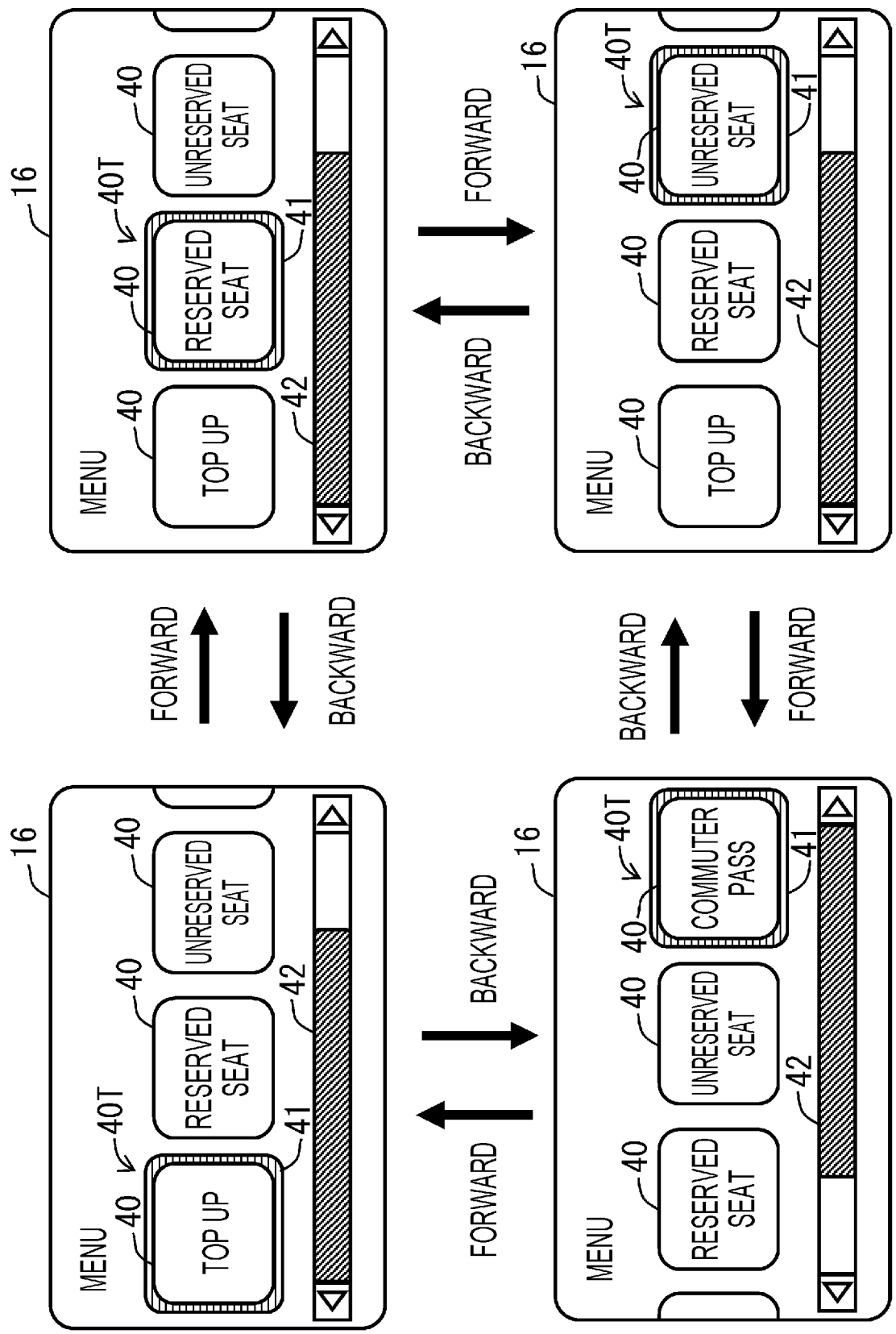
FIG. 17 illustrates an example of a standard menu screen for a railroad ticket vending machine.

FIG. 17 illustrates an example of a standard menu screen of the railroad ticket vending machine and corresponds to the standard menu screen of the multi-function apparatus 10 in FIG. 7. The standard menu includes "top up," "reserved seat," "unreserved seat," and "commuter pass" icons 40. The railroad ticket vending machine includes a touch panel and reader. With an IC card ticket as a memory held over the reader of the railroad ticket vending machine, the tentative selection mark 41 is moved to one of the icons 40 displayed on the touch panel and a selected icon 40 is thus confirmed in the same way as described with reference the exemplary embodiment. In related art railroad ticket vending machines, the user may touch an icon with a finger to display a variety of menus (switches from one menu to another) and input a variety of information. According to the exemplary embodiment, the switching of the menus and the inputting of the variety of information may be performed by an operation of holding the IC card ticket over the reader. As described above, the examples of the information processing apparatuses include but are not limited to the multi-function apparatus, bank ATM, and railroad ticket vending machine.

Numerical Entry Screen

An example of the numerical entry screen is described further below. FIG. 18 illustrates an example of a personal identification number (PIN) input screen of the bank ATM. The PIN input screen includes the input information display screen 52 and first through fifth icon groups 40G1, 40G2, 40G3, 40G4, and 40G5. The input information display screen 52 is a screen portion where numbers entered using the first through fourth icon groups 40G1 through 40G4 are masked. Each of the first through fourth icon groups 40G1 through 40G4 includes icons ("1" through "9" and "0") used to enter numbers at 1's place, 10's place, 100's place, and 1000's place of the PIN. The fifth icon group 40G5 includes "complete setting," "re-enter," and "go back."

With the PIN input screen in FIG. 18 displayed, the processor 24 performs, in response to the operation of holding the IC card 12, control to move the tentative selection mark 41 from one icon to another among the icons included in the fourth icon group 40G4 (icons for the 1000's place). When the selection of an icon in the fourth icon group 40G4 is confirmed, the processor 24 performs, in response to the operation of holding the IC card 12, control to move the tentative selection mark 41 from one icon to another among the icons included in the third icon group 40G3 (icons for the 100's place). Similarly, when the selection of an icon in the third icon group 40G3 is confirmed, the processor 24 performs, in response to the operation of holding the IC card 12, control to move the tentative selection mark 41 from one icon to another among the icons included in the second icon group 40G2 (icons for the 10's place). Similarly, when the selection of an icon in the second icon group 40G2 is confirmed, the processor 24 performs, in response to the operation of holding the IC card 12, control to move the tentative selection mark 41 from one icon to another among the icons included in the first icon group 40G1 (icons for the 1's place). When the selection of an icon in the first icon group 40G1 is confirmed, the processor 24 performs control to move the tentative selection mark 41 from one icon to another among the icons included in the fifth icon group 40G5 (icons for "complete setting," "re-enter," and "go back").

The user confirms the selection of the numerical value of each place of the PIN in the order the fourth, third, second, and first icon group 40G4, 40G3, 40G2, and 40G1 and then confirms the selection of the "complete setting" icon in the fifth icon group 40G5. Each time the number at each place is confirmed, the processor 24 temporarily stores the entered number and updates the masked display on the input information display screen 52. When the "complete setting" icon is confirmed in the fifth icon group 40G5, the processor 24 receives the temporarily stored numerical values as the PIN. When the user has selected the "re-enter" icon in the fifth icon group 40G5, the processor 24 performs control, in response to the operation of holding the IC card 12 over, to move the tentative selection mark 41 from one icon to another among the icons included in the fourth icon group 40G4 (icons for the 1000's place) and the processor 24 then receives the re-entry of the PIN from the user. The numerical entry screen described above may be employed in the information processing apparatus.

User Authentication

User authentication is described below. When the memory, such as an IC card, is held over the reader, the processor 24 may perform user authentication by reading the user identification information from the memory. For example, while the variety of screen operations are performed by the IC card, another IC card may be held over the reader. In such a case, the screen of the touch panel may be initialized. The initialization of the screen signifies that the screen on the display (such as a touch panel) is transitioned back to a default screen (a screen prior to the standard menu screen) or the standard menu screen. In such a case, information accepted heretofore may be deleted from the apparatus.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to:
        detect, via a reader, a memory when placed in close proximity to the reader or when spaced apart from the reader after being in close proximity to the reader; and
        in response to the memory being spaced apart from the reader after being in close proximity to the reader, perform display control such that a selection of a selection element moves to another selection element among a plurality of selection elements displayed on a display.

2. The information processing apparatus according to claim 1, wherein the memory stores identification information on a user, and
    wherein the processor is configured to perform user authentication by reading the identification information on the user from the memory when the memory is placed in close proximity to the reader.

3. The information processing apparatus according to claim 2, the processor is configured to, when the memory is not in close proximity to the reader for a predetermined period of time after being spaced apart from the reader with the selection element being selected,
    receive an instruction for the selection element, providing that the selection of the selection element is confirmed.

4. The information processing apparatus according to claim 3, wherein the processor is configured to:
    when the memory is in close proximity to the reader for a predetermined period of time or shorter, perform the display control such that the selection moves to an adjacent selection element in a first direction; and
    when the memory is in close proximity to the reader for longer than the predetermined period of time, perform the display control such that the selection moves to an adjacent selection element in a second direction different from the first direction.

5. The information processing apparatus according to claim 3, wherein the processor is configured to, when the memory is in close proximity to the reader for longer than a predetermined period of time,
  perform the display control, while the memory remains in close proximity to the reader, such that the plurality of selection elements displayed on the display are sequentially selected every specific time duration in a direction different from a direction where the plurality of selection elements are sequentially selected in response to the memory being spaced apart from the reader after being in close proximity to the reader.

6. The information processing apparatus according to claim 2, wherein the processor is configured to:
  when the memory is in close proximity to the reader for a predetermined period of time or shorter, perform the display control such that the selection moves to an adjacent selection element in a first direction; and
  when the memory is in close proximity to the reader for longer than the predetermined period of time, perform the display control such that the selection moves to an adjacent selection element in a second direction different from the first direction.

7. The information processing apparatus according to claim 2, wherein the processor is configured to, when the memory is in close proximity to the reader for longer than a predetermined period of time,
  perform the display control, while the memory remains in close proximity to the reader, such that the plurality of selection elements displayed on the display are sequentially selected every specific time duration in a direction different from a direction where the plurality of selection elements are sequentially selected in response to the memory being spaced apart from the reader after being in close proximity to the reader.

8. The information processing apparatus according to claim 2, wherein the processor is configured to, when the memory is not in close proximity to the reader for a predetermined period of time,
  perform the display control such that, regardless of the detection of the memory, the plurality of selection elements displayed on the display are sequentially selected every specific time duration.

9. The information processing apparatus according to claim 2, wherein the processor is configured to, when the memory is placed in close proximity to the reader setting a selection element to be in a selected display state and remains in close proximity to the reader for longer than a predetermined period of time,
  receive an instruction for the selection element in the selected display state, providing that the selection of the selection element in the selected display state is confirmed.

10. The information processing apparatus according to claim 1, the processor is configured to, when the memory is not in close proximity to the reader for a predetermined period of time after being spaced apart from the reader with the selection element being selected,
  receive an instruction for the selection element, providing that the selection of the selection element is confirmed.

11. The information processing apparatus according to claim 10, wherein the processor is configured to:
  when the memory is in close proximity to the reader for a predetermined period of time or shorter, perform the display control such that the selection moves to an adjacent selection element in a first direction; and
  when the memory is in close proximity to the reader for longer than the predetermined period of time, perform the display control such that the selection moves to an adjacent selection element in a second direction different from the first direction.

12. The information processing apparatus according to claim 10, wherein the processor is configured to, if when the memory is in close proximity to the reader for longer than a predetermined period of time,
  perform the display control, while the memory remains in close proximity to the reader, such that the plurality of selection elements displayed on the display are sequentially selected every specific time duration in a direction different from a direction where the plurality of selection elements are sequentially selected in response to the memory being spaced apart from the reader after being in close proximity to the reader.

13. The information processing apparatus according to claim 1, wherein the processor is configured to:
  when the memory is in close proximity to the reader for a predetermined period of time or shorter, perform the display control such that the selection moves to an adjacent selection element in a first direction; and
  when the memory is in close proximity to the reader for longer than the predetermined period of time, perform the display control such that the selection moves to an adjacent selection element in a second direction different from the first direction.

14. The information processing apparatus according to claim 1, wherein the processor is configured to, when the memory is in close proximity to the reader for longer than a predetermined period of time,
  perform the display control, while the memory remains in close proximity to the reader, such that the plurality of selection elements displayed on the display are sequentially selected every specific time duration in a direction different from a direction where the plurality of selection elements are sequentially selected in response to the memory being spaced apart from the reader after being in close proximity to the reader.

15. The information processing apparatus according to claim 1, wherein the processor is configured to, when the memory is not in close proximity to the reader for a predetermined period of time,
  perform the display control such that, regardless of the detection of the memory, the plurality of selection elements displayed on the display are sequentially selected every specific time duration.

16. The information processing apparatus according to claim 15, wherein the processor is configured to, when the memory is placed in close proximity to the reader setting a selection element to be in a selected display state and remains in close proximity to the reader for longer than a predetermined period of time,
  receive an instruction for the selection element in the selected display state, providing that the selection of the selection element in the selected display state is confirmed.

17. The information processing apparatus according to claim 1, wherein the processor is configured to, when the memory is placed in close proximity to the reader setting a selection element to be in a selected display state and remains in close proximity to the reader for longer than a predetermined period of time, receive an instruction for the selection element in the selected display state, providing that the selection of the selection element in the selected display state is confirmed.

18. The information processing apparatus according to claim 1, wherein the processor is configured to, when the memory is placed in close proximity to the reader setting a selection element to be in a selected display state, spaced apart from the reader after being placed in close proximity to the reader, and placed again in close proximity to the reader and remains in close proximity for longer than a predetermined period of time, receive an instruction for the selection element in the selected display state, providing that the selection of the selection element in the selected display state is confirmed.

19. A non-transitory computer readable medium storing a program causing a computer to execute a process, the process comprising:

detecting, via a reader, a memory when placed in close proximity to the reader or when spaced apart from the reader after being in close proximity to the reader; and in response to the memory being spaced apart from the reader after being in close proximity to the reader, performing display control such that a selection of a selection element moves to another selection element among a plurality of selection elements displayed on a display.

20. An information processing method comprising:

detecting, via a reader, a memory when placed in close proximity to the reader or when spaced apart from the reader after being in close proximity to the reader; and in response to the memory being spaced apart from the reader after being in close proximity to the reader, performing display control such that a selection of a selection element moves to another selection element among a plurality of selection elements displayed on a display.

\* \* \* \* \*